(12) United States Patent
Abel et al.

(10) Patent No.: US 7,689,641 B2
(45) Date of Patent: Mar. 30, 2010

(54) SIMD INTEGER MULTIPLY HIGH WITH ROUND AND SHIFT

(75) Inventors: James C. Abel, Phoenix, AZ (US);
Derin C. Walters, Austin, TX (US);
Jonathan J. Tyler, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 10/610,833

(22) Filed: Jun. 30, 2003

(65) Prior Publication Data

US 2004/0267857 A1 Dec. 30, 2004

(51) Int. Cl.
*G06F 7/52* (2006.01)
(52) U.S. Cl. ...................................... 708/620
(58) Field of Classification Search ......... 708/620–632, 708/490, 523
See application file for complete search history.

(56) References Cited

U.S. PATENT DOCUMENTS

| | | | |
|---|---|---|---|
| 3,910,664 A | | 10/1975 | Pauza et al. |
| 4,841,468 A | * | 6/1989 | Miller et al. ................. 708/625 |
| 4,982,352 A | * | 1/1991 | Taylor et al. ................. 708/201 |
| 5,675,526 A | | 10/1997 | Peleg et al. |
| 5,969,975 A | * | 10/1999 | Glass et al. .................. 708/490 |
| 6,167,419 A | * | 12/2000 | Saishi et al. ................. 708/620 |
| 6,167,420 A | * | 12/2000 | Saishi et al. ................. 708/620 |
| 6,370,559 B1 | * | 4/2002 | Hoffman ..................... 708/625 |
| 6,457,036 B1 | * | 9/2002 | Sloan .......................... 708/650 |
| 6,839,728 B2 | * | 1/2005 | Pitsianis et al. ............. 708/404 |

FOREIGN PATENT DOCUMENTS

| | | |
|---|---|---|
| JP | 11-500547 | 1/1996 |
| JP | 2002-527808 | 8/2002 |
| WO | WO96/17293 | 6/1996 |
| WO | WO00/22503 | 4/2000 |

OTHER PUBLICATIONS

Kuroda, I., et al., "A 16-Bit Parallel MAC Architecture for a Multimedia RISC Processor", Signal Processing Systems, Oct. 8-10, 1998 pp. 103-112, XP010303736, ISBN:0-7803-4997-0.
"Cyrix extended MMX Instruction Set" pp- 1, 8, 10, 11, 17, Oct. 1997, XP002434416, http://www.enlight.ru/docs/cpu/mmxs/108ap. pdf.

* cited by examiner

*Primary Examiner*—Chat C Do
(74) *Attorney, Agent, or Firm*—Blakely, Sokoloff, Taylor & Zafman, LLP

(57) ABSTRACT

Method, apparatus, and program means for performing a packed multiply high with round and shift operation. The method of one embodiment comprises receiving a first operand having a first set of L data elements. A second operand having a second set of L data elements is received. L pairs of data elements are multiplied together to generate a set of L products. Each of the L pairs includes a first data element from the first set of L data element and a second data element from a corresponding data element position of the second set of L data elements. Each of the L products are rounded to generate L rounded values. Each of said L rounded values are scaled to generate L scaled values. Each of the L scaled values are truncated for storage at a destination. Each truncated value is to be stored at a data element position corresponding to its pair of data elements.

57 Claims, 15 Drawing Sheets

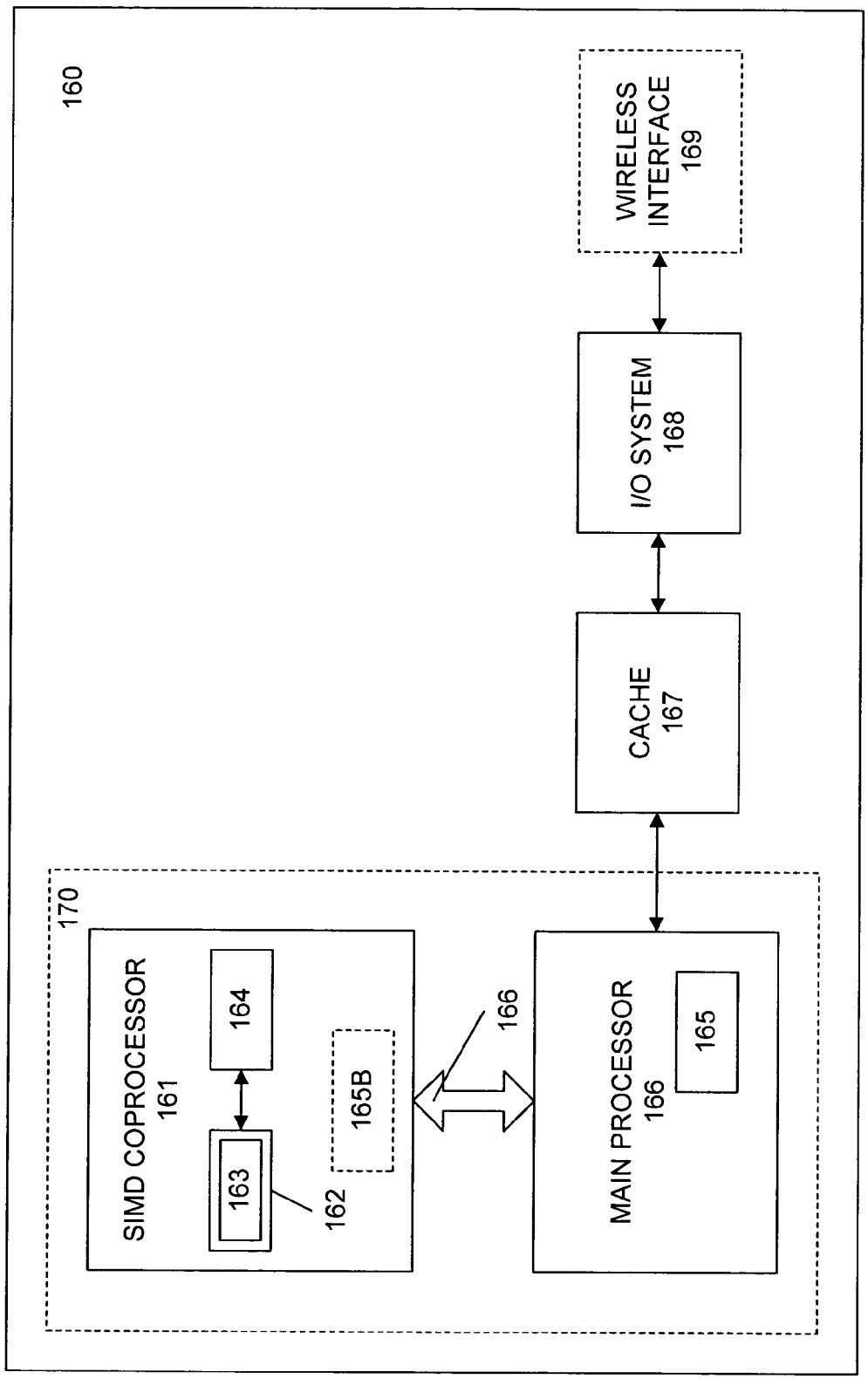

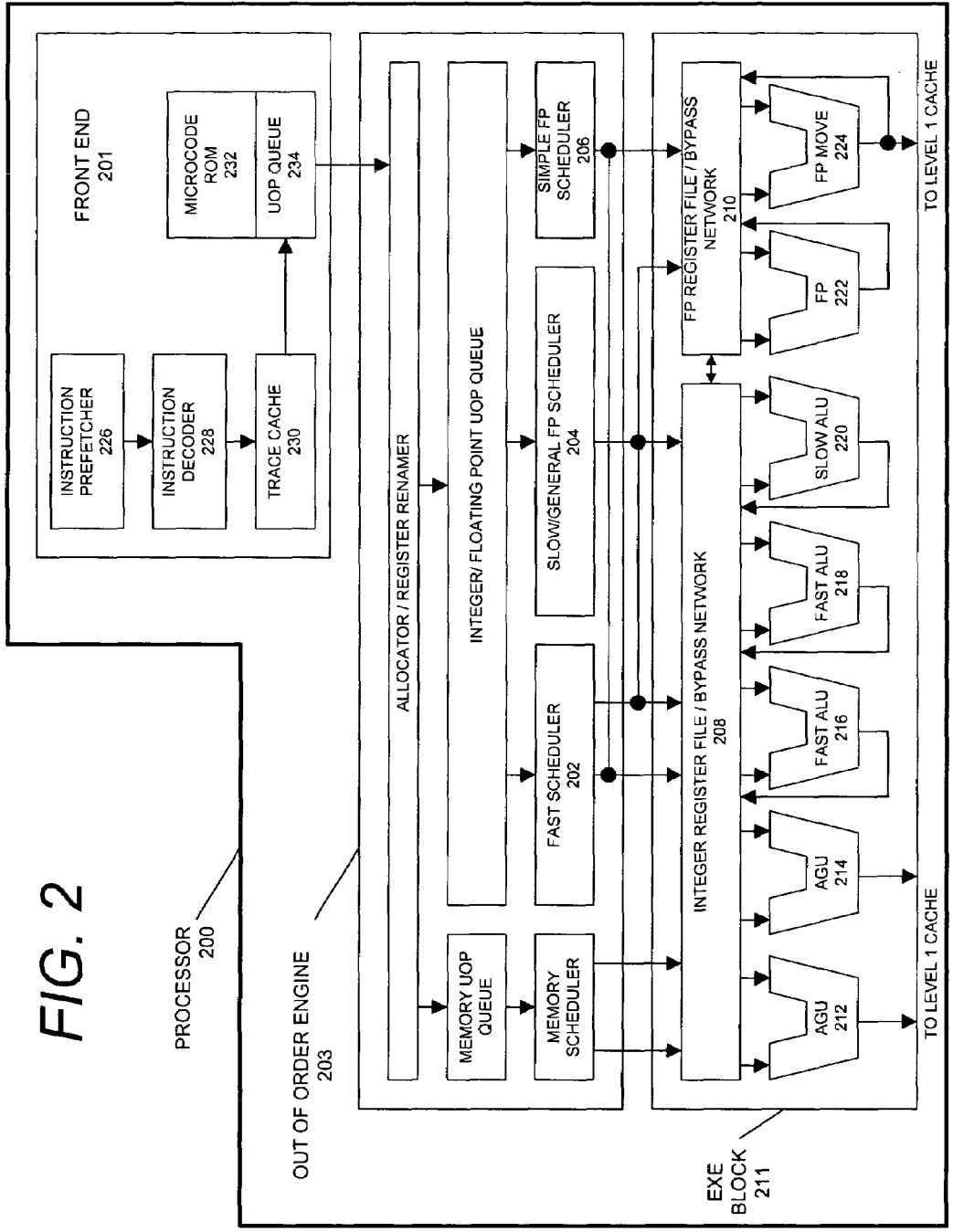

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | | | bbbb bbbb | bbbb bbbb | bbbb bbbb |

UNSIGNED PACKED BYTE REPRESENTATION 302

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • • • | | sbbb bbbb | sbbb bbbb | sbbb bbbb |

SIGNED PACKED BYTE REPRESENTATION 304

| 127 | 112 111 | | 16 15 | 0 |
|---|---|---|---|---|
| wwww wwww wwww wwww | | • • • | wwww wwww wwww wwww |

UNSIGNED PACKED WORD REPRESENTATION 306

| 127 | 112 111 | | 16 15 | 0 |
|---|---|---|---|---|
| swww wwww wwww wwww | | • • • | swww wwww wwww wwww |

SIGNED PACKED WORD REPRESENTATION 308

| 127 | 92 91 | 32 31 | 0 |
|---|---|---|---|
| dddd dddd dddd dddd dddd dddd dddd dddd | • • • | dddd dddd dddd dddd dddd dddd dddd dddd |

UNSIGNED PACKED DOUBLEWORD REPRESENTATION 310

| 127 | 92 91 | 32 31 | 0 |
|---|---|---|---|
| sddd dddd dddd dddd dddd dddd dddd dddd | • • • | sddd dddd dddd dddd dddd dddd dddd dddd |

SIGNED PACKED DOUBLEWORD REPRESENTATION 312

*FIG. 3A*

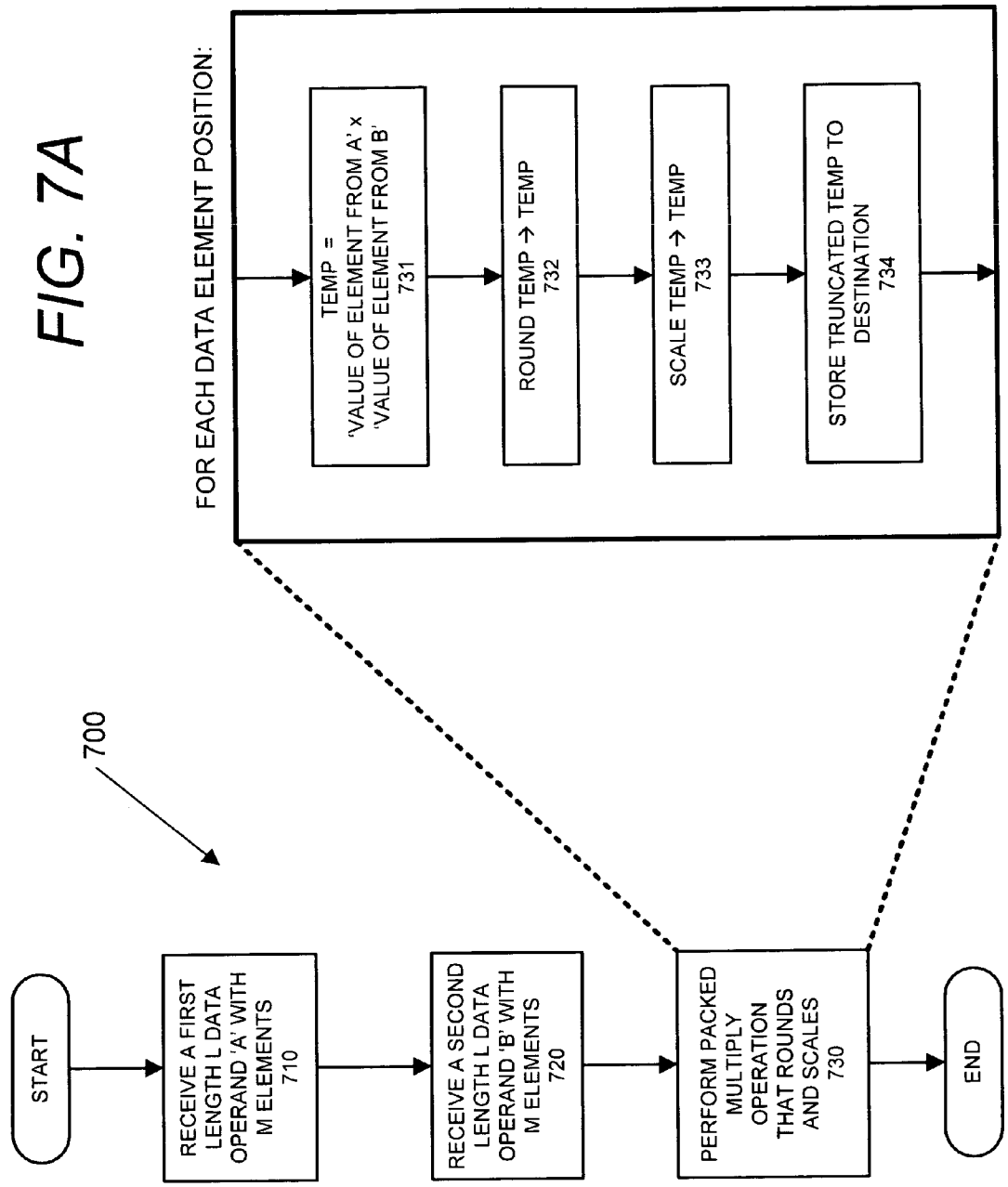

SIMD INTEGER MULTIPLY HIGH WITH ROUND AND SHIFT

FIELD OF THE INVENTION

The present disclosure pertains to the field of processing apparatuses and associated software and software sequences that perform mathematical operations.

DESCRIPTION OF RELATED ART

Computer systems have become increasingly pervasive in our society. The processing capabilities of computers have increased the efficiency and productivity of workers in a wide spectrum of professions. As the costs of purchasing and owning a computer continues to drop, more and more consumers have been able to take advantage of newer and faster machines. Furthermore, many people enjoy the use of notebook computers because of the freedom. Mobile computers allow users to easily transport their data and work with them as they leave the office or travel. This scenario is quite familiar with marketing staff, corporate executives, and even students.

As processor technology advances, newer software code is also being generated to run on machines with these processors. Users generally expect and demand higher performance from their computers regardless of the type of software being used. One such issue can arise from the kinds of instructions and operations that are actually being performed within the processor. Certain types of operations require more time to complete based on the complexity of the operations and/or type of circuitry needed. This provides an opportunity to optimize the way certain complex operations are executed inside the processor.

Media applications have been driving microprocessor development for more than a decade. In fact, most computing upgrades in recent years have been driven by media applications. These upgrades have predominantly occurred within consumer segments, although significant advances have also been seen in enterprise segments for entertainment enhanced education and communication purposes. Nevertheless, future media applications will require even higher computational requirements. As a result, tomorrow's personal computing experience will be even richer in audio-visual effects, as well as being easier to use, and more importantly, computing will merge with communications.

Accordingly, the display of images, as well as playback of audio and video data, which is collectively referred to as content, have become increasingly popular applications for current computing devices. Filtering and convolution operations are some of the most common operations performed on content data, such as image audio and video data. Such operations are computationally intensive, but offer a high level of data parallelism that can be exploited through an efficient implementation using various data storage devices, such as for example, single instruction multiple data (SIMD) registers. Similarly, video encode or transcode are some of the most processing intensive application targets for these kinds of instructions. A number of current architectures also require unnecessary data type changes which minimizes instruction throughput and significantly increases the number of clock cycles required to order data for arithmetic operations.

BRIEF DESCRIPTION OF THE FIGURES

The present invention is illustrated by way of example and not limitation in the Figures of the accompanying drawings, in which like references indicate similar elements.

FIG. 1C is a block diagram of yet another exemplary computer system in accordance with another alternative embodiment of the present invention;

FIG. 2 is a block diagram of the micro-architecture for a processor of one embodiment that includes logic circuits to perform a packed integer multiply high with round and shift operation in accordance with the present invention;

FIG. 3A illustrates various packed data type representations in multimedia registers according to one embodiment of the present invention;

FIG. 7A is a flowchart illustrating one embodiment of a method to perform an integer multiply with round and shift on packed data operands to obtain the high portion of the products.

DETAILED DESCRIPTION

Figure 1A:
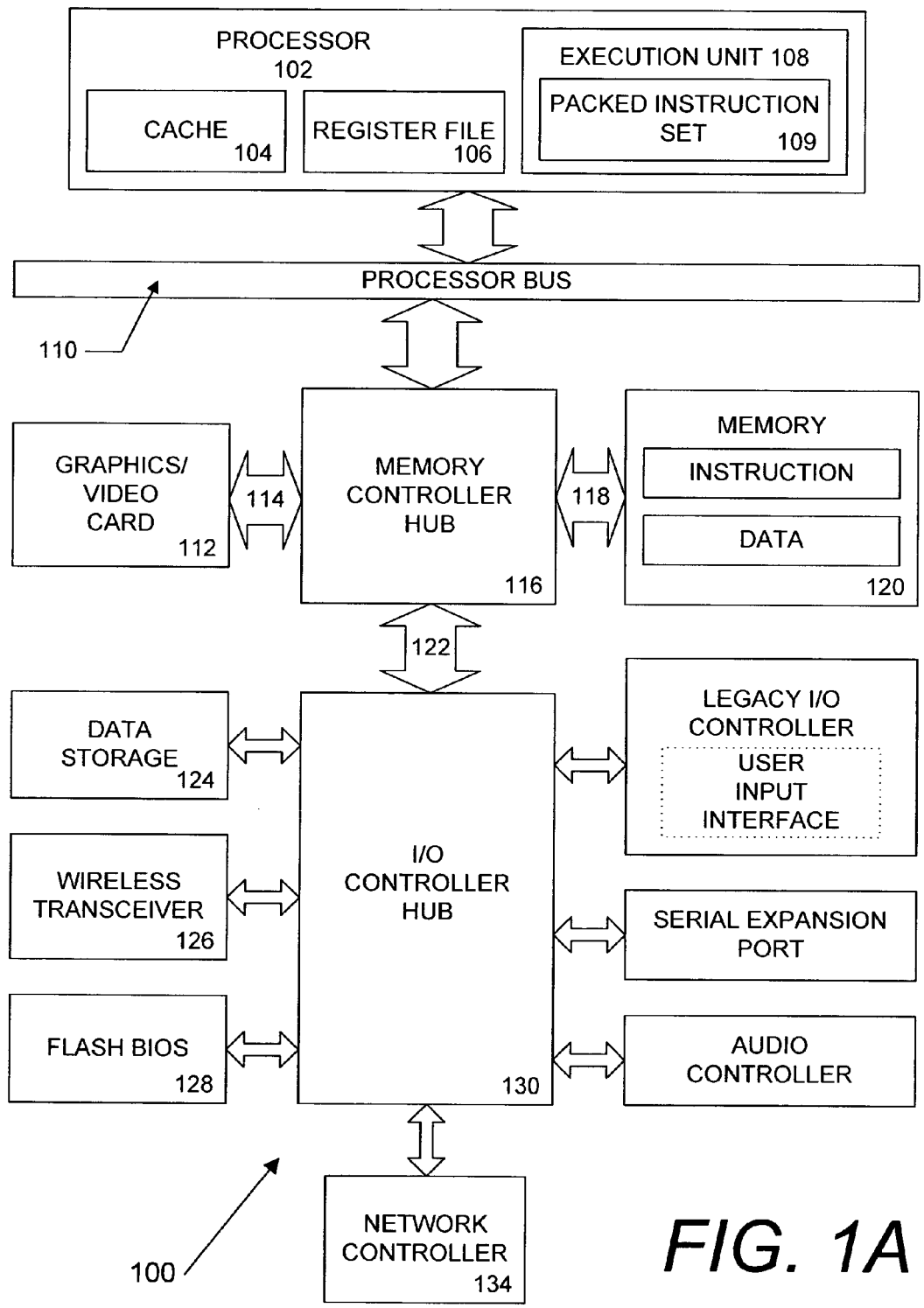
FIG. 1A is a block diagram of a computer system formed with a processor that includes an execution unit to execute a SIMD instruction for an integer multiply high operation with rounding and shifting in accordance with one embodiment of the present invention.

The following description describes embodiments of a simd integer multiply with round and shift. In the following description, numerous specific details such as processor types, micro-architectural conditions, events, enablement mechanisms, and the like are set forth in order to provide a more thorough understanding of the present invention. It will be appreciated, however, by one skilled in the art that the invention may be practiced without such specific details. Additionally, some well known structures, circuits, and the like have not been shown in detail to avoid unnecessarily obscuring the present invention.

Although the following embodiments are described with reference to a processor, other embodiments are applicable to other types of integrated circuits and logic devices. The same techniques and teachings of the present invention can easily be applied to other types of circuits or semiconductor devices that can benefit from higher pipeline throughput and improved performance. The teachings of the present invention are applicable to any processor or machine that performs data manipulations. However, the present invention is not limited to processors or machines that perform 256 bit, 128 bit, 64 bit, 32 bit, or 16 bit data operations and can be applied to any processor and machine in which manipulation of packed data is needed.

In the following description, for purposes of explanation, numerous specific details are set forth in order to provide a thorough understanding of the present invention. One of ordinary skill in the art, however, will appreciate that these specific details are not necessary in order to practice the present invention. In other instances, well known electrical structures and circuits have not been set forth in particular detail in order to not necessarily obscure the present invention. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

Although the below examples describe instruction handling and distribution in the context of execution units and logic circuits, other embodiments of the present invention can be accomplished by way of software. In one embodiment, the methods of the present invention are embodied in machine-executable instructions. The instructions can be used to cause a general-purpose or special-purpose processor that is programmed with the instructions to perform the steps of the present invention. The present invention may be provided as a computer program product or software which may include a machine or computer-readable medium having stored thereon instructions which may be used to program a computer (or other electronic devices) to perform a process according to the present invention. Alternatively, the steps of the present invention might be performed by specific hardware components that contain hardwired logic for performing the steps, or by any combination of programmed computer components and custom hardware components. Such software can be stored within a memory in the system. Similarly, the code can be distributed via a network or by way of other computer readable media.

Thus a machine-readable medium may include any mechanism for storing or transmitting information in a form readable by a machine (e.g., a computer), but is not limited to machine readable storage medium( e.g., floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory), and machine transmission medium (e.g., a transmission over the Internet, electrical, optical, acoustical or other forms of propagated signals (e.g., carrier waves, infrared signals, digital signals, etc.) or the like). Accordingly, the computer-readable medium includes any type of media/machine-readable medium suitable for storing or transmitting electronic instructions or information in a form readable by a machine (e.g., a computer). Moreover, the present invention may also be downloaded as a computer program product. As such, the program may be transferred from a remote computer (e.g., a server) to a requesting computer (e.g., a client). The transfer of the program may be by way of electrical, optical, acoustical, or other forms of data signals embodied in a carrier wave or other propagation medium via a communication link (e.g., a modem, network connection or the like).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

In modern processors, a number of different execution units are used to process and execute a variety of code and instructions. Not all instructions are created equal as some are quicker to complete while others can take an enormous number of clock cycles. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more and more computer systems are used in internet and multimedia applications, additional processor support has been introduced over time. For instance, Single Instruction, Multiple Data (SIMD) integer/floating point instructions and Streaming SIMD Extensions (SSE) are instructions that reduce the overall number of instructions required to execute a particular program task. These instructions can speed up software performance by operating on multiple data elements in parallel. As a result, performance gains can be achieved in a wide range of applications including video, speech, and image/photo processing. The implementation of SIMD instructions in microprocessors and similar types of logic circuit usually involve a number of issues. Furthermore, the complexity of SIMD operations often leads to a need for additional circuitry in order to correctly process and manipulate the data.

Two's-complement notation is an efficient way of representing signed numbers. The most significant bit of a two's complement number represents its sign and the remaining bits represent its magnitude. Fixed point fractional arithmetic provides a more convenient way of looking at and processing data for the multiplication of numbers on an integer processor. Fractional arithmetic is very useful for digital signal processing programming as issues concerning overflows on multiplies are absent. Whereas the multiplication of two 16 bit numbers can require 32 bits for the resultant, the 32 bit resultant generated by multiplying two 16 bit fixed point fractional numbers can be rounded into 16 bits with the introduction of minimal error. The conversion of a 16 bit integer is the division of the decimal value of that integer by 32768. In one embodiment, the top 16 bits of the product from multiplying two fractional numbers are those of interest. However, the top 16 bits of the result is half the expected fractional result. The product has to be left-shifted one bit to multiply the result by two, giving the correct final product. Fractional arithmetic also requires the sign-extension of multipliers and multiplicands.

The left shift requirement can also be explained as a decimal place alignment in the decimal realm. For example, when multiplying decimal numbers, the decimal points are ignored and put back at the end. The decimal point is placed so that the total number of digits right of the decimal point in the multiplier and multiplicand is equal to the number of digits right of the decimal point in their product. Similarly, the "decimal point" or binary point position here for fractional arithmetic is to the right of the leftmost (sign) bit and there are 15 bits (digits) to the right of this point. But there are a total of 30 bits to the right of the binary point in the sources. Without a shift, there would be 31 bits to the right of the binary point in the 32 bit result. Shifting the number to the left by one bit effectively reduces the number of bits right of the binary point to thirty.

Embodiments of the present invention can increase the precision of fixed point integer SIMD instructions. The fixed point integer format is similar to that of the fixed point fractional arithmetic. The '1.15' fixed point format of one embodiment represents a number having a signed value wherein the binary point is located between bits 14 and 15. For this and the following discussions, bit positions are counted from the rightmost bit starting from 0. Thus the rightmost or least significant bit is at position 0. The bit position immediate to its left is bit 1, and etc. This 1.N numeric format is often used in digital signal processing (DSP) applications. Embodiments in accordance to the present invention can also provide additional precision and accuracy from the rounding and shifting techniques. The additional accuracy achieved from embodiments of the present invention can help many applications become easier to program. Furthermore, the additional accuracy can also enable the execute faster execution of algorithms such as the Discrete Cosine Transform (DCT) that is frequently used in video and image processing applications.

One example application for a SIMD integer multiply high with round and shift instruction is in high quality video. A 16 bit by 16 bit (16×16) multiply with a 16 bit result is very common in video encoders and decoders, especially in inverse DCT, DCT, quantization (Q), and inverse Q blocks. The accuracy of the multiply operations can have significant impacts on the overall video quality. Performance improvements and speedup by embodiments of the present invention are can have a greater impact than just on inverse DCT calculations. Q and inverse Q calculations, which are basically 16 bit multiplies, in addition to DCT calculations can also benefit.

The computing industry is generally familiar with the EEE Standards Specifications 1180-1990 for the Implementations of 8×8 Inverse Discrete Cosine Transform. Although the standard arose in the context of video conferencing, portions of the specification are also being applied towards encoders and decoders, such as with the various MPEG formats. However, compliance with the IEEE 1180-1190 standard while maintaining high performance can be difficult. The tradeoff is often fast performance with non-compliance or compliance with slow performance. Furthermore, coding to the standard is an iterative process that can be very time consuming, especially if the wrong algorithm is selected.

Compliance with the IEEE 1180-1990 standard can be facilitated with embodiments of the multiply high with round and shift instruction. Embodiments of SIMD integer multiply high with round and shift instructions in accordance to the present invention can provide the same 1.15 data format for input and output data elements in a packed data environment. Thus code writing and programming with instruction sets including an embodiment of this multiply high with round and shift operation can be much less complicated. Similarly, the accessibility of high level languages and related compilers can also become possible. Developers can be able to take advantage of languages and compilers enabled with an embodiments of fixed point SIMD instruction, such as the integer multiply high with round and shift, to improve the performance and accuracy of video, audio, and image coder/decoders (codecs). Instruction sets with SIMD capabilities can help avoid the lengthy algorithms that were previously required in handling repetitious operations on similar data.

Each of the inputs to the multiply in one implementation are in a 1.15 format. For one embodiment of a multiply high with round and shift instruction, a temporary 18 bit value having a 2.16 format is created from the upper bits of a 32 bit product from the multiplication of the two 16 bit data values. This temporary 18 bit value is then rounded for accuracy by adding '1' to the least significant bit. Whereas some techniques simply truncate all the low order bits, the rounding operation in this embodiment of the present invention allows the error to fall within some acceptable threshold for inverse DCT coding. This rounded value is shifted left one bit for additional accuracy and to obtain the desired output format. A 16 bit result having a 1.15 format is extracted from the rounded and shifted 18 bit value. The rounding and shifting performed on the temporary value can provide two bits of additional accuracy over simply taking the high order 16 bits of a 32 bit product. For example, in the general embodiment described here, the rounding provides one bit of additional accuracy over the high order 16 bit extraction from the 32 bit product. Similarly, the shifting provides another additional bit of accuracy over a rounded product. Although these discussions describe embodiments in the context of 16 bit long integer values, other embodiments can be applied to data values of any bit length.

FIG. 1A is a block diagram of an exemplary computer system formed with a processor that includes execution units to execute an instruction for a multiply high with round and shift operation in accordance with one embodiment of the present invention. System 100 includes a component, such as a processor 102 to employ execution units including logic to perform algorithms for processing data, in accordance with the present invention, such as in the embodiment described herein. System 100 is representative of processing systems based on the PENTIUM® III, PENTIUM® 4, Xeon™, Itanium®, and/or XScale™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used.

Thus, the present invention is not limited to any specific combination of hardware circuitry and software.

Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that performs misaligned memory copies or moves. Furthermore, some architectures have been implemented to enable instructions to operate on several data simultaneously to improve the efficiency of multimedia applications. As the type and volume of data increases, computers and their processors have to be enhanced to manipulate data in more efficient methods.

FIG. 1A is a block diagram of a computer system 100 formed with a processor 102 that includes one or more execution units 108 to process an algorithm including a SIMD integer multiply high with round and shift instruction in accordance with the present invention. For example, the processor 102 can receive program instructions requesting SIMD multiply high operations on packed data operands. The present embodiment is described in the context of a single processor desktop or server system, but alternative embodiments can be included in a multiprocessor system. System 100 is an example of a hub architecture. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions.

In one embodiment, the processor 102 includes a Level 1 (L1) internal cache memory 104. Depending on the architecture, the processor 102 can have a single internal cache or multiple levels of internal cache. Alternatively, in another embodiment, cache memory can reside external to the processor 102. Other embodiments can also include a combination of both internal and external caches depending on the implementation. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. For this embodiment, execution unit 108 includes logic to handle a packed instruction set 109. In one embodiment, the packed instruction set 109 includes a packed multiply high instruction for obtaining the relevant high order portions of resultant products. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications can be accelerated and executed more efficiently by using the full width of a processor's data bus for performing operations on packed data. This can eliminate the need to transfer smaller units of data across the processor's data bus to perform one or more operations one data element at a time. Alternate embodiments of an execution unit 108 can also be used in micro controllers, embedded processors, graphics devices, DSPs, and other types of logic circuits. System 100 includes a memory 120. Memory 120 can be a dynamic random access memory (DRAM) device, a static random access memory (SRAM) device, flash memory device, or other memory device. Memory 120 can store instructions and/or data represented by data signals that can be executed by processor 102.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 102, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 102. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an execution unit to execute a packed multiply high instruction can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 1B:
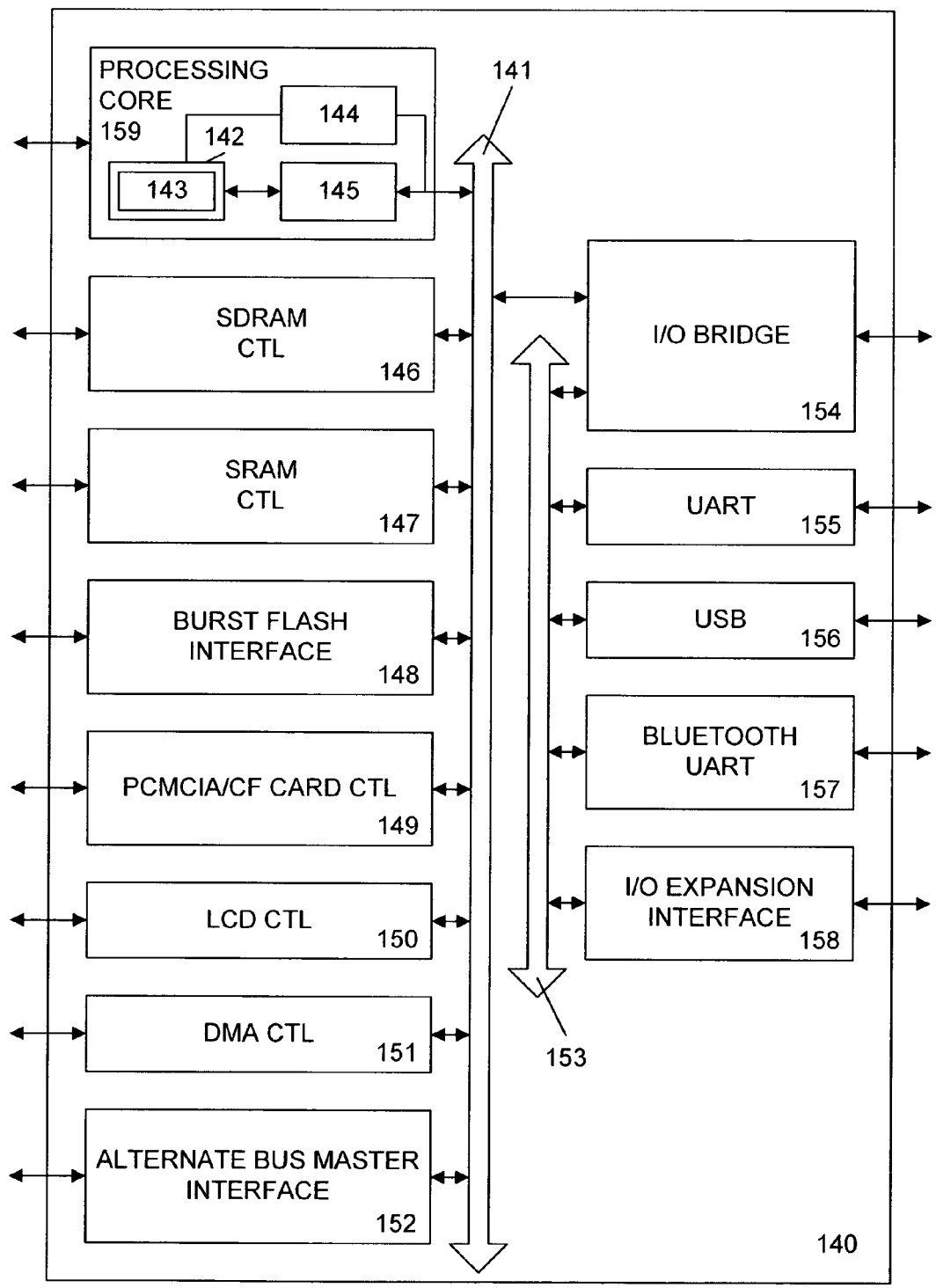
FIG. 1B is a block diagram of another exemplary computer system in accordance with an alternative embodiment of the present invention.

FIG. 1B illustrates an alternative embodiment of a data processing system 140 which implements the principles of the present invention. One embodiment of data processing system 140 is an Intel® Personal Internet Client Architecture (Intel® PCA) applications processors with Intel XScale™ technology (as described on the world-wide web at developer.intel.com). It will be readily appreciated by one of skill in the art that the embodiments described herein can be used with alternative processing systems without departure from the scope of the invention.

Computer system 140 comprises a processing core 159 capable of performing SIMD operations including a multiply high with round and shift. For one embodiment, processing core 159 represents a processing unit of any type of architecture, including but not limited to a CISC, RISC or VLIW type architecture. Processing core 159 may also be suitable for manufacture in one or more process technologies and by being represented on a machine readable media in sufficient detail, may be suitable to facilitate that manufacture.

Processing core 159 comprises an execution unit 142, a set of register file(s) 145, and a decoder 144. Processing core 159 also includes additional circuitry (not shown) which is not necessary to the understanding of the present invention. Execution unit 142 is used for executing instructions received by processing core 159. In addition to recognizing typical processor instructions, execution unit 142 can recognize instructions in packed instruction set 143 for performing operations on packed data formats. Packed instruction set 143 includes instructions for supporting data multiply operations, and may also include other packed instructions. Execution unit 142 is coupled to register file 145 by an internal bus. Register file 145 represents a storage area on processing core 159 for storing information, including data. As previously mentioned, it is understood that the storage area used for storing the packed data is not critical. Execution unit 142 is coupled to decoder 144. Decoder 144 is used for decoding instructions received by processing core 159 into control signals and/or microcode entry points. In response to these control signals and/or microcode entry points, execution unit 142 performs the appropriate operations.

Processing core 159 is coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 capable of performing SIMD operations including a multiply high with round and shift operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

FIG. 1C illustrates yet alternative embodiments of a data processing system capable of performing SIMD multiply high operations. In accordance with one alternative embodiment, data processing system 160 may include a main processor 166, a SIMD coprocessor 161, a cache memory 167, and an input/output system 168. The input/output system 168 may optionally be coupled to a wireless interface 169. SIMD coprocessor 161 is capable of performing SIMD operations including a multiply high. Processing core 170 may be suitable for manufacture in one or more process technologies and by being represented on a machine readable media in sufficient detail, may be suitable to facilitate the manufacture of all or part of data processing system 160 including processing core 170.

For one embodiment, SIMD coprocessor 161 comprises an execution unit 162 and a set of register file(s) 164. One embodiment of main processor 165 comprises a decoder 165 to recognize instructions of instruction set 163 including a SIMD packed multiply high instructions for execution by execution unit 162. For alternative embodiments, SIMD coprocessor 161 also comprises at least part of decoder 165B to decode instructions of instruction set 163. Processing core 170 also includes additional circuitry (not shown) which is not necessary to the understanding of the present invention.

In operation, the main processor 166 executes a stream of data processing instructions that control data processing operations of a general type including interactions with the cache memory 167, and the input/output system 168. Embedded within the stream of data processing instructions are SIMD coprocessor instructions. The decoder 165 of main processor 166 recognizes these SIMD coprocessor instructions as being of a type that should be executed by an attached SIMD coprocessor 161. Accordingly, the main processor 166 issues these SIMD coprocessor instructions (or control signals representing SIMD coprocessor instructions) on the coprocessor bus 166 where from they are received by any attached SIMD coprocessors. In this case, the SIMD coprocessor 161 will accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. For one embodiment of processing core 170, main processor 166, and a SIMD coprocessor 161 are integrated into a single processing core 170 comprising an execution unit 162, a set of register file(s) 164, and a decoder 165 to recognize instructions of instruction set 163 including SIMD multiply high instructions.

FIG. 2 is a block diagram of the micro-architecture for a processor 200 of one embodiment that includes logic circuits to perform a packed integer multiply high with round and shift operation in accordance with the present invention. The SIMD integer multiply high operation with round and shift may also be referred to as a packed multiply high (PMUL high) with round and shift operation or a multiply high operation. For one embodiment of a packed multiply high instruction, the instruction can cause data to be taken from the two memory blocks, multiplying together the corresponding data elements from the two respective blocks to obtain a set of temporary results, rounding and shifting those temporary results, and truncating those intermediate results into the desired high order portions of the respective product for storage at a resultant data block. The SIMD multiply high instruction can also be referred to as PMULHRSW or packed multiply high with round and shift. In this embodiment, the integer multiply with round and shift instruction can also be implemented to operate on data elements having sizes of byte, word, doubleword, quadword, etc. Although the discussions herein are in the context of integer values and integer operations, alternative embodiments of the present invention can be used with floating point values and floating point operations.

The in-order front end 201 is the part of the processor 200 that fetches the macro-instructions to be executed and prepares them to be used later in the processor pipeline. The front end 201 of this embodiment includes several units. The instruction prefetcher 226 fetches macro-instructions from memory and feeds them to an instruction decoder 228 which in turn decodes them into primitives called micro-instructions or micro-operations (also called micro op or uops) that the machine knows how to execute. The trace cache 230 takes decoded uops and assembles them into program ordered sequences or traces in the uop queue 234 for execution. When the trace cache 230 encounters a complex macro-instruction, microcode ROM 232 provides uops needed to complete the operation.

Many macro-instructions are converted into a single micro-op, and others need several micro-ops to complete the full operation. For one embodiment, if more than four micro-ops are needed to complete a macro-instruction, the decoder 228 accesses the microcode ROM 232 to do the macro-instruction. In one embodiment, a multiply high with round and shift instruction can be decoded into a small number of micro ops for processing at the instruction decoder 228. In another embodiment, an instruction for a packed multiply high with round and shift algorithm can be stored within the microcode ROM 232 should a number of micro-ops be needed to accomplish the operation. The trace cache 230 refers to an entry point programmable logic array (PLA) to determine a correct micro-instruction pointer for reading micro-code sequences for integer multiply with round and shift algorithms in the micro-code ROM 232. After the microcode ROM 232 finishes sequencing micro-ops for the current macro-instruction, the front end 201 of the machine resumes fetching micro-ops from the trace cache 230.

Some SIMD and other multimedia types of instructions are considered complex instructions. Most floating point related instructions are also complex instructions. As such, when the instruction decoder 228 encounters a complex macro-instruction, the microcode ROM 232 is accessed at the appropriate location to retrieve the microcode sequence for that macro-instruction. The various micro-ops needed for performing that macro-instruction are communicated to the out-of-order execution engine 203 for execution at the appropriate integer and floating point execution units.

The out-of-order execution engine 203 is where the micro-instructions are prepared for execution. The out-of-order execution logic has a number of buffers to smooth out and re-order the flow of micro-instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206, determine when a uop is ready to execute based on the readiness of their dependent input register operand sources and the availability of the execution resources the uops need to complete their operation. The fast scheduler 202 of this embodiment can schedule on each half of the main clock cycle while the other schedulers can only schedule once per main processor clock cycle. The schedulers arbitrate for the dispatch ports to schedule uops for execution.

Register files 208, 210, sit between the schedulers 202, 204, 206, and the execution units 212, 214, 216, 218, 220, 222, 224 in the execution block 211. There is a separate register file 208, 210, for integer and floating point operations, respectively. Each register file 208, 210, of this embodiment also includes a bypass network that can bypass or forward just completed results that have not yet been written into the register file to new dependent uops. The integer register file 208 and the floating point register file 210 are also capable of communicating data with the other. The floating point register file 210 of one embodiment has 128 bit wide entries because floating point instructions often have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of this embodiment is comprised of a number of execution units: address generation unit (AGU) 212, AGU 214, fast ALU 216, fast ALU 218, slow ALU 220, floating point ALU 222, floating point move unit 224. For this embodiment, the floating point execution blocks 222, 224, execute floating point, MMX, SIMD, and SSE operations. The floating point ALU 222 of this embodiment includes a 64 bit by 64 bit floating point divider to execute divide, square root, and remainder micro-ops. For embodiments of the present invention, any act involving a floating point value occurs with the floating point hardware. For example, conversions between integer format and floating point format involve a floating point register file. Similarly, a floating point divide operation happens at a floating point divider.

On the other hand, non-floating point numbers and integer type are handled with integer hardware resources. The simple, very frequent ALU operations go to the high-speed ALU execution units 216, 218. The fast ALUs 216, 218, of this embodiment can. execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For this embodiment, the integer ALUs 216, 218, 220, are described in the context of performing integer operations on 64 bit data operands. In alternative embodiments, the ALUs 216, 218, 220, can be implemented to support a variety of data bits including 16, 32, 128, 256, etc. Similarly, the floating point units 222, 224, can be implemented to support a range of operands having bits of various widths. For one embodiment, the floating point units 222, 224, can operate on 128 bits wide packed data operands in conjunction with SIMD and multimedia instructions.

The term "registers" is used herein to refer to the on-board processor storage locations that are used as part of macro-instructions to identify operands. In other words, the registers referred to herein are those that are visible from the outside of the processor (from a programmer's perspective). However, the registers of an embodiment should not be limited in meaning to a particular type of circuit. Rather, a register of an embodiment need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32 bit integer data. A register file of one embodiment also contains eight multimedia SIMD registers for packed data. For the discussions below, the registers are understood to be data registers designed to hold packed data, such as 64 bit wide MMX™ registers (also referred to as 'mm' registers in some instances) in microprocessors enabled with MMX technology from Intel Corporation. These MMX registers, available in both integer and floating point forms, can operated with packed data elements that accompany SIMD and SSE instructions. Similarly, 128 bit wide XMM registers relating to SSE2 technology can also be used to hold such packed data operands. In this embodiment, in storing packed data and integer data, the registers do not need to differentiate between the two data types.

FIG. 3A illustrates various signed and unsigned packed data type representations in 128 bit wide multimedia registers according to one embodiment of the present invention. The packed byte format of this example contains sixteen packed byte data elements. A byte is defined here as eight bits of data. Unsigned packed byte representation 302 illustrates the storage of an unsigned packed byte in a SIMD register. Information for each byte data element is stored in bit 7 through bit 0 for byte 0, bit 15 through bit 8 for byte 1, bit 23 through bit 16 for byte 2, and finally bit 128 through bit 120 for byte 15. Thus, all available bits are used in the register. This storage arrangement can also increase the storage efficiency of the processor. With sixteen data elements accessed, one operation can now be performed on sixteen data elements in a parallel fashion.

Signed packed byte representation 304 illustrates the storage of a signed packed byte. Note that the eighth bit of every byte data element is the sign indicator. The packed word format of this example contains eight packed word data elements. Each packed word contains sixteen bits of information. Unsigned packed word representation 306 illustrates how word 7 through word 9 are stored in a SIMD register. Signed packed word representation 308 is similar to the unsigned packed word in-register representation 306. Note that the sixteenth bit of each word data element is the sign indicator. The packed doubleword format here is 128 bits long and contains four packed doubleword data elements. Each packed doubleword element contains thirty two bits of information. Unsigned packed doubleword representation 310 shows how doubleword data elements are stored. Signed packed doubleword representation 312 is similar to unsigned packed doubleword in-register representation 310. Note that the necessary sign bit is the thirty-second bit of each doubleword data element. A packed quadword is 128 bits long and contains two packed quadword data elements.

Generally, a data element is an individual piece of data that is stored in a single register or memory location with other data elements of the same length. In packed data sequences relating to SSE2 technology, the number of data elements stored in a XMM register is 128 bits divided by the length in bits of an individual data element. Similarly, in packed data sequences relating to MMX and SSE technology, the number of data elements stored in an MMX register is 64 bits divided by the length in bits of an individual data element. Although the data types illustrated in FIG. 3A are 128 bit long, embodiments of the present invention can also operate with 64 bit wide or other sized operands.

Figure 3B:
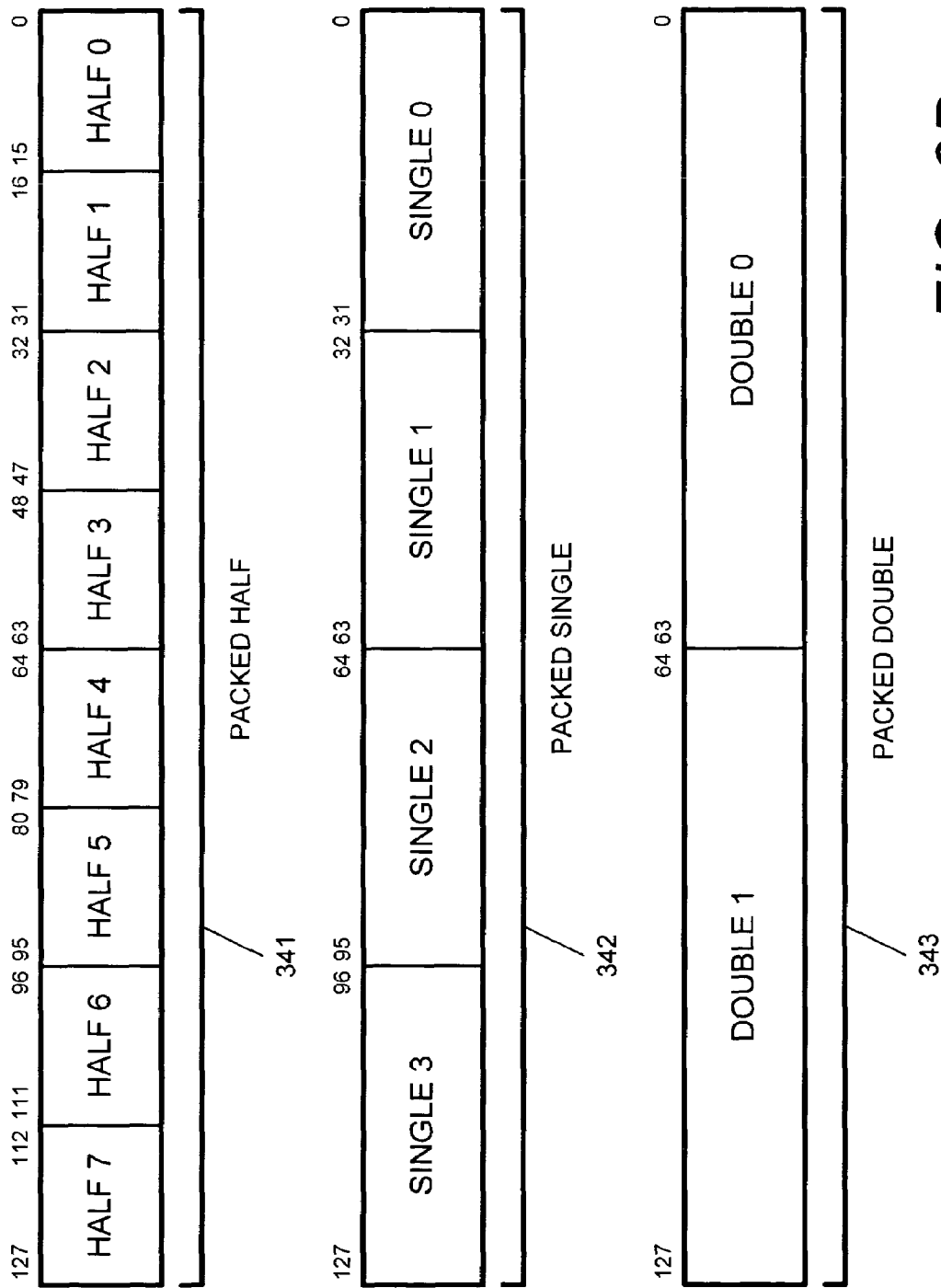
FIG. 3B illustrates packed data-types in accordance with an alternative embodiment.

FIG. 3B illustrates alternative in-register data storage formats. Each packed data can include more than one independent data element. Three packed data formats are illustrated; packed half 341, packed single 342, and packed double 343. One embodiment of packed half 341, packed single 342, and packed double 343 contain fixed-point data elements. For an alternative embodiment one or more of packed half 341, packed single 342, and packed double 343 may contain floating-point data elements. One alternative embodiment of packed half 341 is 128 bits long containing eight 16-bit data elements. One embodiment of packed single 342 is 128 bits long and contains four 32-bit data elements. One embodiment of packed double 343 is 128 bits long and contains two 64-bit data elements. It is appreciated that such packed data formats may be further extended to other register lengths, for example, to 96-bits, 160-bits, 192-bits, 224-bits, 256-bits or more.

Figure 3C:
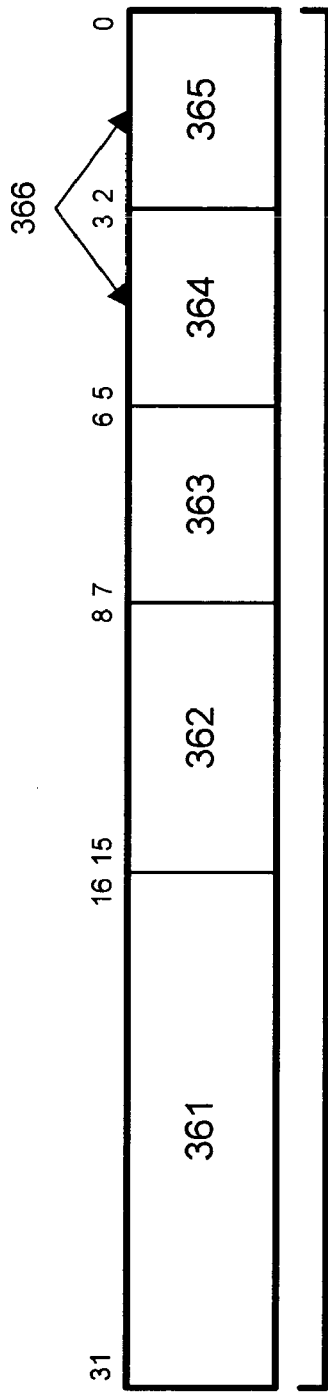
FIG. 3C illustrates one embodiment of an operation encoding (opcode) format for a packed multiply high with round and shift instruction.

FIG. 3C is a depiction of one embodiment of an operation encoding (opcode) format 360, having thirty-two or more bits, and register/memory operand addressing modes corresponding with a type of opcode format described in the "IA-32 Intel Architecture Software Developer's Manual Volume 2: Instruction Set Reference," which is which is available from Intel Corporation, Santa Clara, Calif. on the world-wide-web (www) at intel.com/design/litcentr. The type of multiply high with round and shift operation, may be encoded by one or more of fields 361 and 362. Up to two operand locations per instruction may be identified, including up to two source operand identifiers 364 and 365. For one embodiment of the multiply with round and shift instruction, destination operand identifier 366 is the same as source operand identifier 364. For an alternative embodiment, destination operand identifier 366 is the same as source operand identifier 365. Therefore, for embodiments of a multiply with round and shift operation, one of the source operands identified by source operand identifiers 364 and 365 is overwritten by the results of the multiply high with round and shift operations. For one embodiment of the multiply with round and shift instruction, operand identifiers 364 and 365 may be used to identify 64-bit source and destination operands.

Figure 3D:
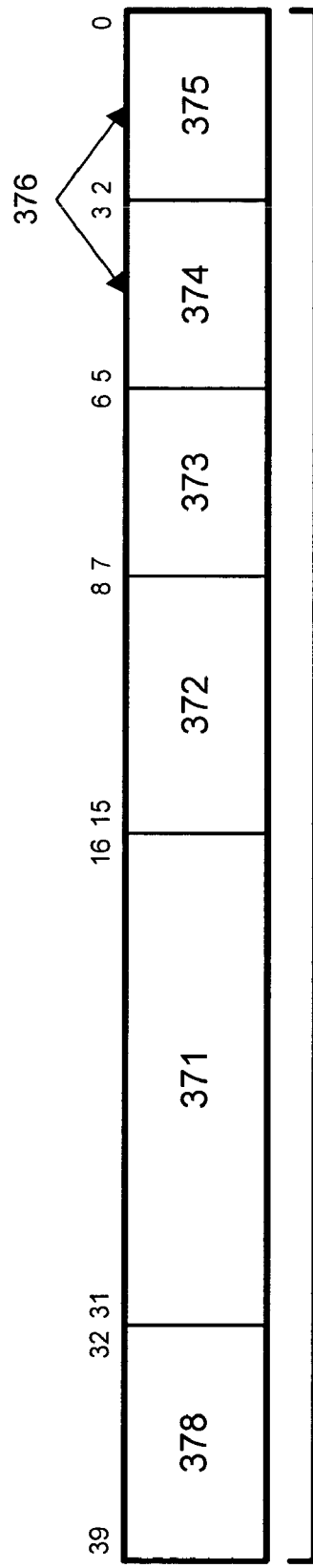
FIG. 3D illustrates an alternative operation encoding format.

FIG. 3D is a depiction of another alternative operation encoding (opcode) format 370, having forty or more bits. Opcode format 370 corresponds with opcode format 360 and comprises an optional prefix byte 378. The type of multiply high with round and shift operation, may be encoded by one or more of fields 378, 371, and 372. Up to two operand locations per instruction may be identified by source operand identifiers 374 and 375 and by prefix byte 378. For one embodiment of the packed multiply high instruction with round and shift, prefix byte 378 may be used to identify 128-bit source and destination operands. For one embodiment of the multiply high instruction, destination operand identifier 376 is the same as source operand identifier 374. For an alternative embodiment, destination operand identifier 376 is the same as source operand identifier 375. Therefore, for embodiments of the multiply high operations, one of the source operands identified by source operand identifiers 374 and 375 is overwritten by the results of the multiply high operations. Opcode formats 360 and 370 allow register to register, memory to register, register by memory, register by register, register by immediate, register to memory addressing specified in part by MOD fields 363 and 373 and by optional scale-index-base and displacement bytes.

Figure 3E:
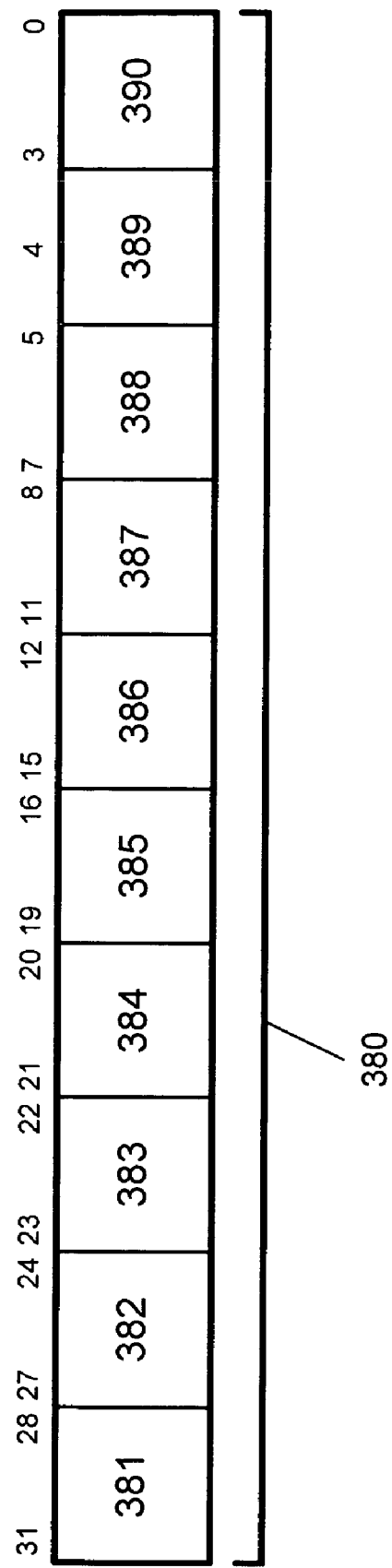
FIG. 3E illustrates yet another alternative operation encoding format.

Turning next to FIG. 3E, in some alternative embodiments, 64 bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for alternative embodiments of multiply high with round and shift operations, may be encoded by one or more of fields 383, 384, 387, and 388. Up to three operand locations per instruction may be identified, including up to two source operand identifiers 385 and 390 and one destination operand identifier 386. One embodiment of the coprocessor can operate on 8, 16, 32, and 64 bit values. For one embodiment, the multiply high operation is performed on fixed-point or integer data elements. In some embodiments, a multiply with round and shift instruction may be executed conditionally, using condition field 381. For some multiply high instructions source data sizes may be encoded by field 383. In some embodiments of a multiply with round and shift instruction, Zero (Z), negative (N), carry (C), and overflow (V) detection can be done on SIMI fields. For some instructions, the type of saturation may be encoded by field 384.

In one implementation of the present invention, the packed multiply high with round and shift can be represented with this instruction format: PMULHRSW mm1, mm2/m64. PMULHRSW in this instance is the mnemonic for packed multiply high with round and shift word. Accompanying the instruction are two source operands, mm1 and mm2/m64, in this case. The instruction of this implementation operates with 64 bit packed data blocks comprised of a plurality of smaller data elements. In this case, the individual data elements are 16 bits or a word in length. Thus four words, forming a total of 64 bits, can reside in each packed data block. The first source operand 'mm1' is a 64 bit MMX register here. In this embodiment, the 64 bit MMX register 'mm1' from the first source operand is also the destination for the resultant of the packed multiply high with round and shift operation. The second source operand 'mm2/m64' in this example can be a 64 bit MMX register (mm2) or a 64 bit memory location (m64).

Although the examples described below are generally in the context of 64 bit long operands and data blocks, embodiments of the multiply high with round and shift instruction can also operate with 128 bit packed data blocks. For example, the instruction format of one embodiment can be represented as: PMULHRSW xmm1, xmm2/m128. The two source operands in this case are each 128 bits in length, each comprised of eight 16 bit word sized data elements. The first source operand 'xmm1' here is a 128 bit XMM register. For this embodiment, the XMM register 'xmm1' is also the destination for the resultants. The second source operand 'xmm2/m128' in this example can be a 128 bit XMM register (xmm2) or a 128 bit memory location (m128). For this embodiment, each of the data blocks can contain a signed integer value. In one implementation, the signed integer value is a two's complement format.

Furthermore, although the embodiments described herein are involve packed data blocks comprised of word sized data elements, data elements of various other sizes are also contemplated. For instance, alternative embodiments of a packed multiply high with round and shift instruction can operate on individual data elements of have lengths of a byte, doubleword, or quadword. Similarly, the lengths of the data operands are not limited to 64 and 128. For example, other embodiments of the instruction can operate on 256 bits long packed operands.

Figure 4A:
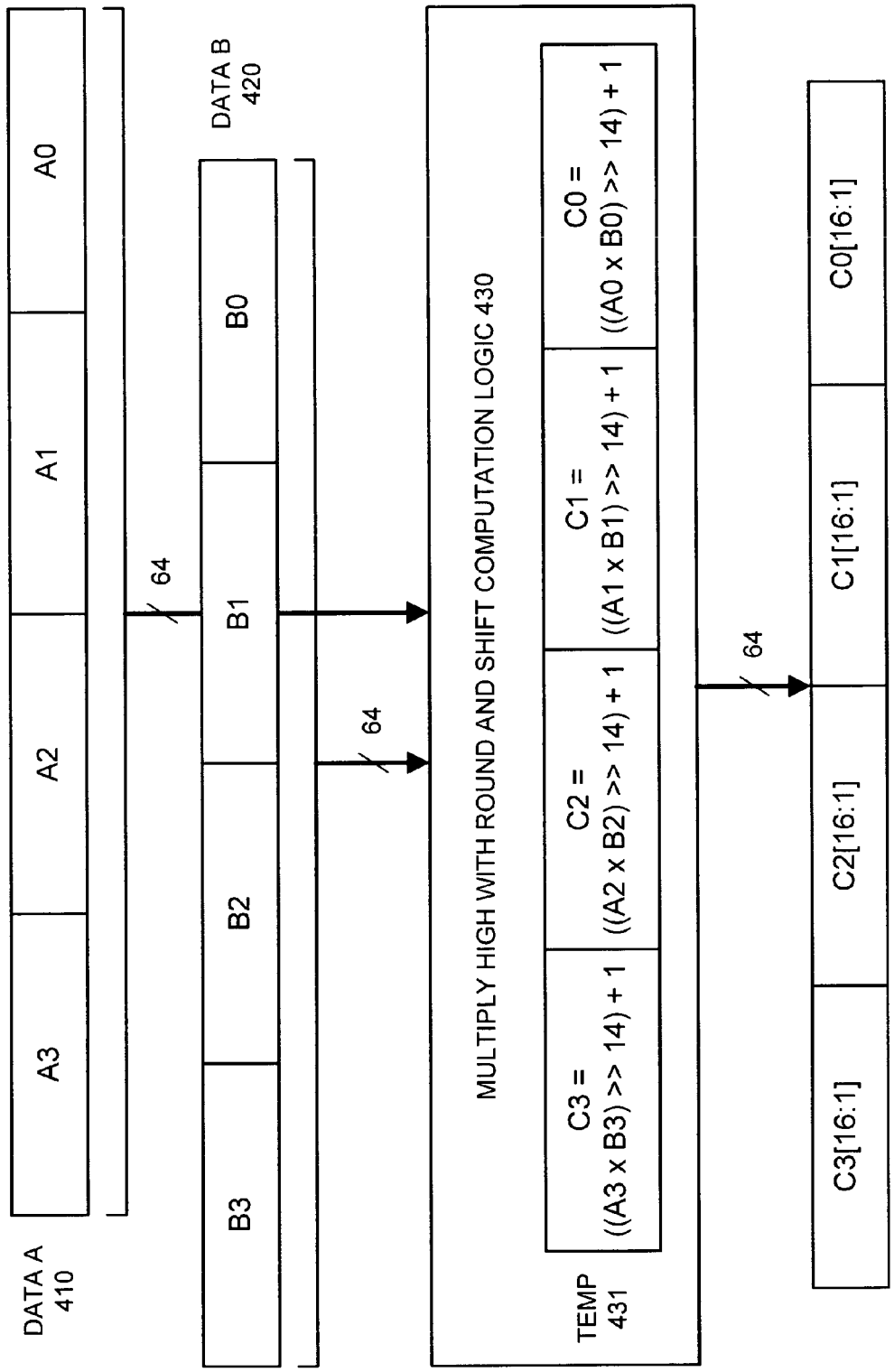
FIG. 4A is a block diagram of one embodiment of logic to perform a SIMD integer multiply high with rounding and shifting operation on data operands in accordance with the present invention.
Figure 4B:
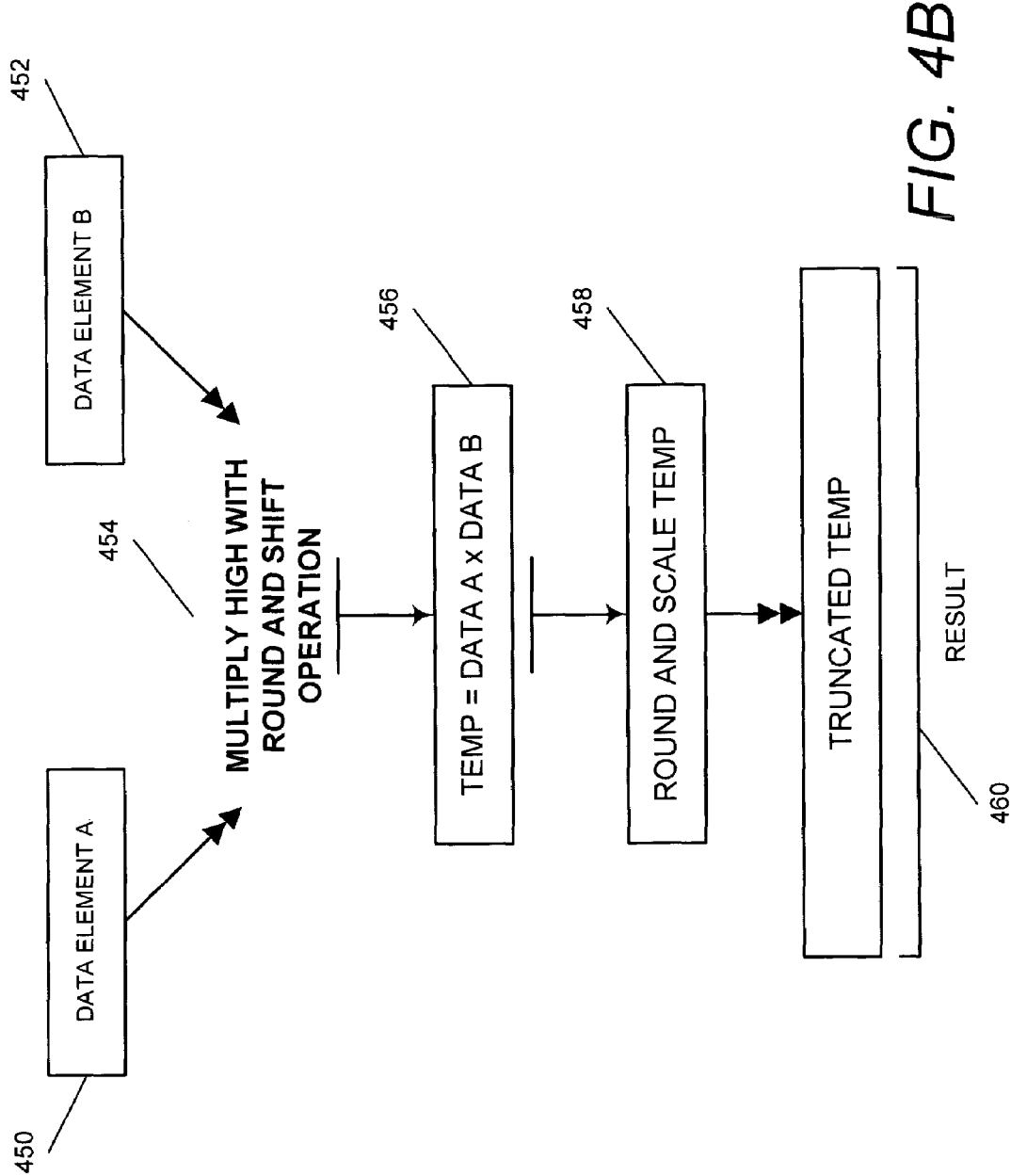
FIG. 4B is a block diagram of the operation of an integer multiply high with round and shift operation for a selected data element position.

FIG. 4B is a block diagram of one embodiment of logic to perform a SIMD integer multiply high with rounding and shifting operation on data operands in accordance with the present invention. The PMULHRSW instruction for a multiply shift high with round and shift operation (also a multiply high for simplicity) of this embodiment begins with two pieces of information: a first data operand DATA A 410 and a second data operand DATA B 420. In one embodiment, the PMULHRSW multiply high instruction is decoded into one micro-operation. In an alternate embodiment, the instruction may be decoded into a varying number of micro-ops to perform the multiply high operation on the data operands.

For these discussions, DATA A 410, DATA B 420, and RESULTANT 440, are generally referred to as operands or data blocks, but are not restricted as such and also include registers, register files, and memory locations. In one embodiment DATA A 410 and DATA B 420 are 64 bits wide MMX registers (also referred to as 'mm' in some instances). Depending on the particular implementation, the data operands can be other widths such as 128 or 256 bits. The first 410 and second 420 operands are data blocks including x data segments and having total widths of 8x bits each if each data segment is a byte (8 bits). Thus each of these data segments are 'x·X·8' bits wide. So if x is 8, each operand is 8 bytes or 64 bits wide. For other embodiments, a data element can be a nibble (4 bits), word (16 bits), doubleword (32 bits), quadword (64 bits), etc. In alternate embodiments, x can be 16, 32, 64, etc. data elements wide.

The first packed operand 410 in this example is comprised of four data elements: A3, A2, A1, and A0. The second packed operand 420 is also comprised of four data elements: B3, B2, B1, and B0. The data elements here are of equal length and each comprise of a single word (16 bits) of data. However, another embodiment of the present invention operates with longer 128 bit operands wherein the data segments are comprised of a single byte (8 bits) each and the 128 bit wide operand would have sixteen byte wide data segments. Similarly, if each data segment was a doubleword (32 bits) or a quadword (64 bits), the 128 bit operand would have four doubleword wide or two quadword wide data segments, respectively. Thus embodiments of the present invention are not restricted to particular length data operands or data segments, and can be sized appropriately for each implementation.

The operands 410, 420, can reside either in a register or a memory location or a register file or a mix. The data operands 410, 420, are sent to the multiply high with round and shift computation logic 430 of an execution unit in the processor along with a multiply high with round and shift instruction. By the time the PMULHRSW instruction reaches the execution unit, the instruction should have been decoded earlier in the processor pipeline. Thus the multiply high instruction can be in the form of a micro operation (uop) or some other decoded format. For this embodiment, the two data operands 410, 420, are received at multiply high with round and shift computation logic 430. As this example is working with 64 bits wide operands, the temporary space 431 needs to hold an intermediate resultant product that is 128 bits wide. For 128 bit wide data operands, a 256 bit wide temporary space is needed.

The logic 430 of this embodiment first multiplies together the corresponding data values at each element position to obtain a product, A×B. Each intermediate 32 bit values of 'A×B' for the four positions are truncated down to 18 bits each. In this embodiment, the truncation is performed as a shift right of each 32 bit value by 14 bits to drop out those bits. This leaves each temporary value with 18 bits. A '1' is added to the least significant bit in this embodiment for rounding purposes. The sixteen bits immediately to the right of the most significant bit of each rounded value are outputted to the respective data element positions in the resultant 440. So for the leftmost data element position in this example, the resultant is equal to bits [16:1] of '((A3×B3)>>14)+1'. The selecting of bits [16:1] of the round results properly scales the value as in fractional arithmetic.

Another embodiment of the invention can operate with alternative length operands and data segments, such as 128/256/512 bits wide operands and bit/byte/word/double word/quad word sized data segments and 8/16/32 bits wide shift counts. Thus embodiments of the present invention are not restricted to particular length data operands, data segments, or shift counts, and can be sized appropriately for each implementation.

The packed integer multiply high with round and shift instruction of one embodiment, when executed, causes a SIMD signed 16 bit by 16 bit multiply of the packed signed integer words in the first source operand and a second source operand to produce a precise 32 bit intermediate product. This intermediate product in one implementation is first truncated to the most significant 18 bits. This selection of this 18 bit value provides 18 bits of intermediate precision. Rounding is performed on this truncated value by adding '1' to the least significant bit of the 18 bit value. In other words, the rounding involves adding '1' to the bit value at bit 14 of the original 32 bit intermediate product. The final resultant value is obtained by selecting the 16 bits immediately to the right of the most significant bit of the 18 bit value. In this embodiment, each resultant value includes a single sign bit. Each resultant data element in this example can have the fix point integer format of '1.15'. By foregoing a 2.14 format where the top 2 bits are sign bits, an additional bit of precision can be achieved with the 1.15 format. The multiply high with round and shift instruction of this embodiment stores the selected 16 bits of each rounded and shifted intermediate 32 bit value in it appropriate position of the destination operand.

For this embodiment, the resultants for this and the other data element positions are packed together into a resultant data block having the same size as the source data operands. For example, if the source packed data operands are 64 or 128 bit wide, the resultant packed data block is also 64 or 128 bit wide, respectively. Furthermore, the source data operands for a sign operation can come from a register or a memory location. For this embodiment, the resultant packed data block overwrites the data in the SIMD register for one of the source data operands.

FIG. 4B is a block diagram of the operation of an integer multiply high with round and shift operation for a selected data element position. DATA ELEMENT A 450 is from a first source operand. DATA ELEMENT B 452 is from a second source operand. The multiply high with round and shift operation 454 of this embodiment begins by multiplying the data elements together to generate the product an intermediate value TEMP 456. For two 16 bit wide source data elements, the product is a 32 bit wide intermediate value. For this embodiment, the most significant 18 bits of TEMP 456 are used in the rounding and scaling. By maintaining 18 bits, additional accuracy and precision can be achieved in the calculations. The multiply high with round and shift operation 454 continues by rounding and scaling the intermediate value 456 to obtain an updated intermediate value 458. In this embodiment of the present invention, the rounding is performed by adding '1' to bit 14 of the 32 bit intermediate value TEMP 456. Incidentally, bit 14 of the 32 bit value is also the least significant bit of the 18 bit wide portion of interest.

Shifting is done on the 32 bit rounded value to scale the intermediate value. A one bit left shift is performed on the round value to arrive at updated intermediate value 458. The updated intermediate value 458 is truncated to arrive at RESULT 460. For this example, the bits of interest are the upper 16 bits of the 32 bit updated intermediate value 458 and are stored as RESULT 460. The lower 16 bits are dropped during the truncation.

Figure 5:
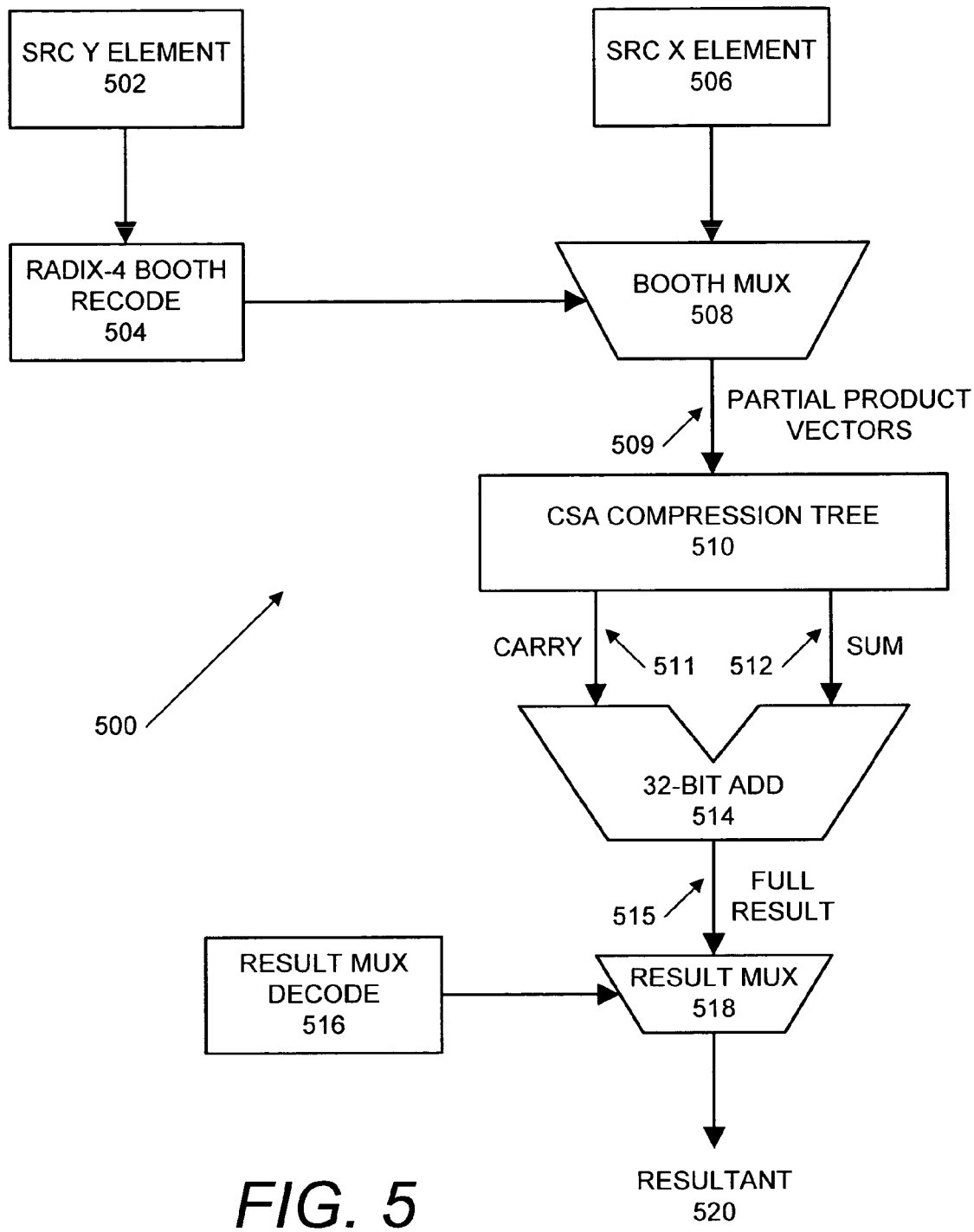
FIG. 5 is a block diagram of one embodiment of a circuit for performing a multiply high with round and shift operation in accordance with the present invention.

FIG. 5 is a block diagram of one embodiment of a circuit 500 for performing a multiply high with round shift operation in accordance with the present invention. The circuit 500 of this embodiment in located within a vector complex integer unit. This integer unit breaks down the PMULHRSW instruction into eight parts for a 128 bit operand implementation, each doing one 16 bit by 16 bit multiply. For a 64 bit operand implementation, four parts are needed. In FIG. 5, SRC Y ELEMENT 502 is sent to the radix-4 booth recode block 504. SRC X ELEMENT 502 is received at booth mux 508. The booth mux generates a set of 9 partial product vectors 509.

During hand multiplication, the process is started by taking the least significant bit of one operand (A) and multiplying this by bit the digitals of another operand (B). Thus for each bit of A that needs to be multiplied by, a row of results is generated. Each one of these rows is known as a partial product. For instance, $$
\begin{array}{r}
1001 \quad (9) \\
\times 0110 \quad (6) \\
\hline
0000 \\
1001 \\
1001 \\
+0000 \\
\hline
0110110 \quad (54)
\end{array}
$$

Because a lot of hardware would be necessary in order to handle all the partial products for the multiplication of large numbers, a booth recoding technique is implemented in one embodiment to simplify the calculation. With booth recoding, a little over half ((N bits/2)+1) as many partial products are generated as with the hand method. For example, instead of having four partial products as above, booth recoding yields 3 partial products. Thus for a 16×16 multiplier, there are '16/2+1' or 9 partial products to add together. This method is also referred to as radix-4 booth encoding here. Each 16 bit multiply array is a radix-4, booth encoded array. The radix-4 booth encoding generates 9 partial products, which are reduced through a carry sum adder (CSA) tree structure and an adder. In one embodiment, the overall 16-bit array structure of the CSA tree looks like:

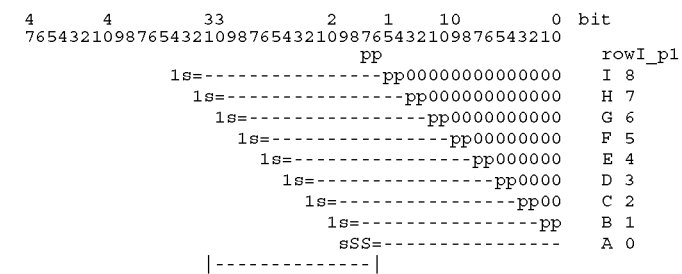

The present embodiment is equipped to handle negative multiplies. The 'S' stands for sign and 'P' is used to describe to lowest two bits of the previous partial product. For example, the "pp" in partial product 1 is the lowest two bits of partial product 0. The essence of the sign extension at the top is to roll off the sign bit. This is similar to the bit inversion in two's complement to make negative numbers positive before multiplication. Similarly, the essence of the 'P' bits is to provide the +1 for two's complement inversion of the negative to positive conversion.

Bits [31:16] can be viewed as the upper order result bits of the multiply. But with a multiply high with round and shift, the rounding and shifting are handled before the final result. In one embodiment, the rounding involves adding a '1' into bit position 14 somewhere in the array. However, there is no free position at bit 14 in the partial product tree to easily add a '1'. At row 8, there are free positions at bit 13, bit 12, and bit 11. Similarly, there is also a free position at bit 11 of row 7. Adding '1' into all four of these locations, as shown with R bits below, will propagate a '1' up into bit position 14. With rounding technique of this embodiment, the CSA compression tree 510 looks like:

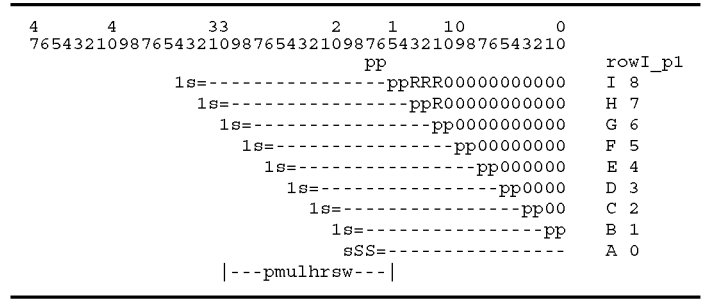

Embodiments of the present invention use CSA's to help reduce the partial product terms from 9 to 2 before the 32 bit adder 514. In one embodiment, the CSA compression tree reduces the number of partial products first from 9 to 6, then 6 to 4, and finally 4 to 2 (using a 4:2 CSA). This technique circumvents the need for nine 32 bit adders. The outputs of the CSA tree 510 in this embodiment are two reduced partial product terms. One is a sum term of the last CSA and the other is a carry out term. To logically add these two terms together to get the full result, the carry out term has to be shifted left one bit in order to properly match up with the sum term. For example, the least significant bit, bit 0, of the carry out term needs to be aligned with bit 1 of the sum term.

A 32 bit adder 514 adds together SUM 512 and CARRY 511 to generate FULL RESULT 515. SUM 512 in this embodiment is SUM[31:0]. CARRY 511 is CARRY [30:0] left shifted by one bit position. The bits of relevance for this embodiment are bits [30:15]. These 16 bits are shifted one bit from the product of the multiply above. For this embodiment of the circuit 500, the shift is implemented with the result mux 518 and result mux decode 516. Thus RESULTANT 520 for a signed integer multiply high with round and shift operation is the 16 bits immediately to the right of the most significant bit of FULL RESULT 515, or in other words FULL RESULT [30:16]. For this embodiment, the resultants from each of the 8 array structures, one for each pairs of data elements, are concatenated together to come up with the final 128 bit result.

Figure 6A:
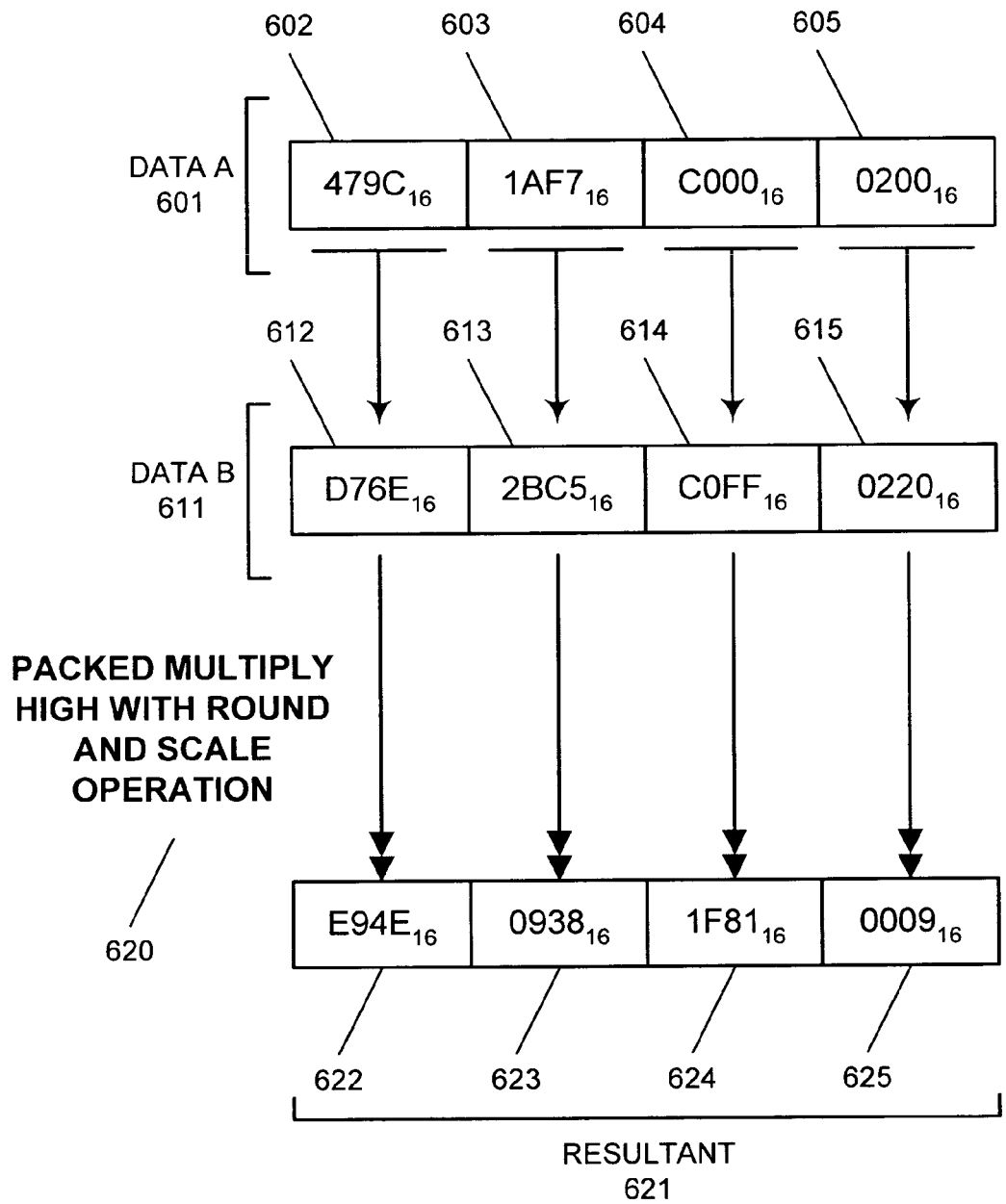
FIG. 6A illustrates the operation of a packed multiply high with round and shift instruction in accordance with a first embodiment of the present invention.

FIG. 6A illustrates the operation of a packed multiply high with round and shift instruction in accordance with a first embodiment of the present invention. The 64 bit wide source operand DATA A 601 is comprised of four data elements 602, 603, 604, 605, filled with hex values $479C_{16}$, $1AF7_{16}$, $C000_{16}$, and $0200_{16}$, respectively. Similarly, 64 bit wide source operand DATA B 611 is comprised of four data elements 612, 613, 614, 615, having hex values $D76E_{16}$, $2BC5_{16}$, $C0FF_{16}$, and $0220_{16}$, respectively. A packed multiply high with round and scale instruction in accordance to one embodiment of the present invention accompanied with DATA A 601 and DATA B 611 as source operands will yield a RESULTANT operand 621. The packed multiply high with round and scale operation 620 of this embodiment generates a result for each corresponding pair of source data elements. In this example, the four data elements in RESULTANT 621 have hex values $E94E_{16}$ 622, $0938_{16}$ 623, $1F81_{16}$ 624, and $0009_{16}$ 625.

Figure 6B:
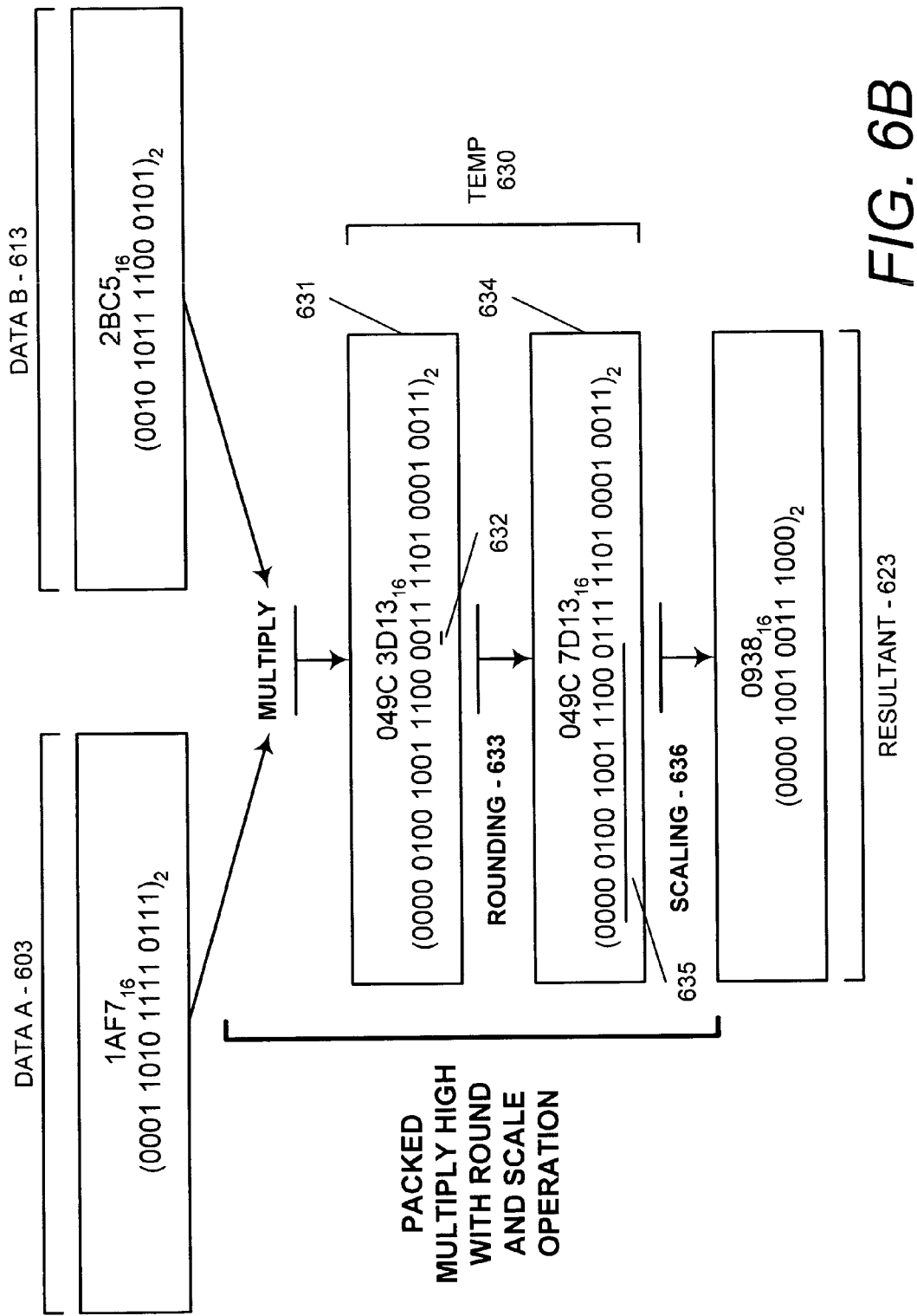
FIG. 6B illustrates in further detail the operation of the packed multiply high instruction at a specific data element position of FIG. 6A.

FIG. 6B illustrates in further detail the operation of the packed multiply high instruction at a specific data element position of FIG. 6A. In continuing with the example of FIG. 6A, the second data element position from the left is currently described in greater detail. The value of the second leftmost data element 603 of DATA A 601 is $1AF7_{16}$ (or 001 1010 1111 0111 in binary). The value of the second leftmost data element 613 of DATA B 611 is $2BC5_{16}$ (or 0010 1011 1100 0101 in binary). During the packed multiply high with round and scale operation, the two values are first multiplied together to obtain a product 631 of 049C $3D13_{16}$ (0000 0100 1001 1100 0011 1101 0001 $0011_2$). This product 631 is handled as a first version of temporary intermediate value TEMP 630.

The rounding 633 portion of the operation is performed on the product 631. In this embodiment, rounding 633 involves adding a value of '1' to bit 14 632 of the product 631. The result 634 of the rounding 633 yields a newer version of TEMP 630. The rounding result 634 has a value of 049C $7D13_{16}$ (0000 0100 1001 1100 0111 1101 0001 $0011_2$). The rounded result 634 is scaled to obtain the desired resultant value in this embodiment. The scaling 636 here is performed as a left shift by one bit of the rounded result 634 in TEMP 630. Thus bits 30 through 15 are shifted up to bit positions 31 through 16. TEMP 630 is truncated to a 16 bit value wherein the most significant 16 bits (high portion) of the rounded and shifted value is outputted as RESULTANT 623. RESULTANT 623 is the second data element position from the left in packed RESULTANT 621. In this example, RESULTANT 623 has a value of $0938_{16}$ (0000 10001 0011 $1000_2$).

The example of this packed multiply high with round scale (PMULHRSW) operation on the second data element positions of a pair 64 bit operands can also be illustrated as:

$0 \times 1AF7 \times 0 \times 2BC5 = 0 \times 0938$

```
temp = 0 × 1AF7 × 0 × 2BC5 = 0 × 049C3D13
                          = 0000 0100 1001 1100 0011 1101 0001 0011
      ROUND                 0000 0000 0000 0000 0100 0000 0000 0000 +
temp (rounded result)      = 0000 0100 1001 1100 0111 1101 0001 0011
      SHIFT<< 1 BIT
temp (shifted result)      = 0000 1001 0011 1000 1111 1010 0010 0110
      TRUNCATE               ────  ────  ────  ────
             RESULT        = 0000 1001 0011 1000 = 0 × 0938
```

In the above examples, one or both source data operands can be 64 bits data registers in a processor enabled with MMX/SSE technology or 128 bits data registers with SSE2 technology. Depending on the implementation, these registers can be 64/128/256 bits wide. Similarly, one or both of the source operand can be memory locations other than a register. For one embodiment, the destination for the resultant is also a MMX or XMM data register. Furthermore, the resultant destination may be the same register as one of the source operands. For instance, in one architecture, a multiply high with round and shift instruction has a first source operand MM1 and a second source operand MM2. The predefined destination for the resultant can be the register for the first source operand, MM1 in this case.

FIG. 7A is a flowchart 700 illustrating one embodiment of a method to perform an integer multiply with round and shift on packed data operands to obtain the high portion of the products. The length values of L is generally used here to represent the width of the operands and data blocks. Depending on the particular embodiment, L can be used to designate the width in terms of number of data segments, bits, bytes, words, etc. At block 710, a first length L data operand A is received for use with the execution of a packed integer multiply high with round and shift operation. A second length L data operand B for the PMULHRSW operation is also received at block 720. At block 730, an instruction to perform a multiply high with round and shift is processed.

The details of the multiply high with round and shift operation at block 730 of this embodiment are now further described in terms of what occurs for each data element position. For one embodiment, the multiply high with round and shift operation for all of the packed resultant data element positions are processed in parallel. In another embodiment, a certain portion of the data elements may be processed at a time. At block 731, a temporary value TEMP is calculated by multiplying together the value of the element from operand A and the value of the element from operand B. The temporary value is rounded at block 732. For one embodiment, the high 18 bits of the temporary value are used in the calculations for better precision. In another embodiment, a different number of bits may be of interest. After the rounding at block 732, the temporary value is scaled at block 733. For this embodiment, the scaling involves shifting the temporary value left by one bit. At block 734, the temporary value is truncated to the needed number of bits and stored to the destination as the resultant value. The resultant value for each of the different pair of source data elements are arranged into the appropriate data element positions corresponding to the source element pairs in the resultant packed operand.

Figure 7B:
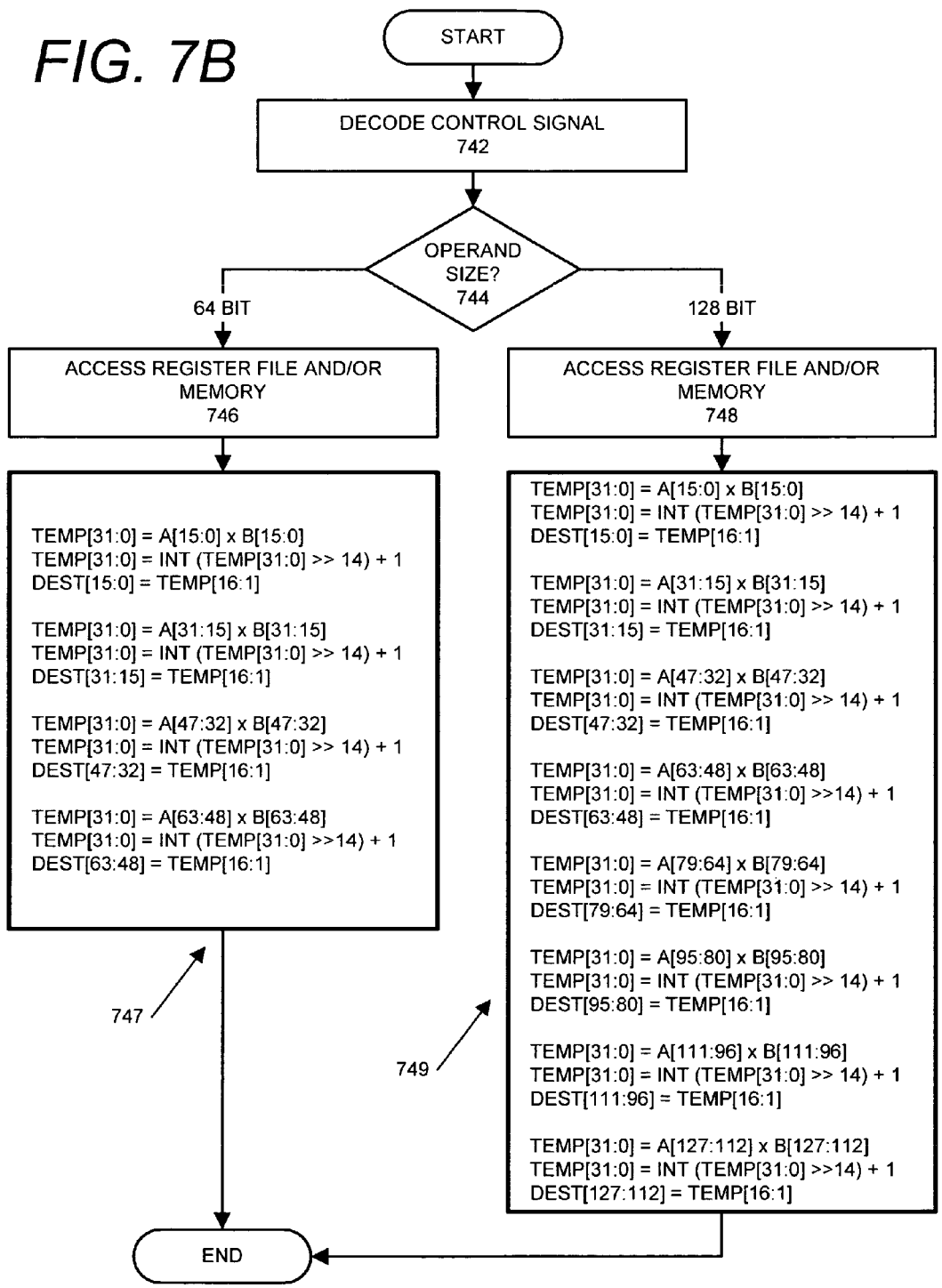
FIG. 7B is a flowchart illustrating another embodiment of a method to obtain the relevant high order portions of resultant products of a packed integer multiply operation with rounding and shifting.

FIG. 7B is a flowchart illustrating another embodiment of a method to obtain the relevant high order portions of resultant products of a packed integer multiply operation with rounding and shifting. In this embodiment, the operands are comprised of word sized data elements. However, other embodiments can be implements with alternatively sized data elements, including byte, doubleword, or quadword, for example. At block 742, the control signal for a multiply high with round and scale operation is decoded. A check is made at block 744 to determine the operand size involved in the operation. For one embodiment, the operand size can be determined with the control signal decoding of block 742. For instance, the operand size may be encoded with the instruction. If the operand size is determined to be 64 bits in length, a register file and/or memory is accessed at block 746 to obtain the operand data depending on where the data is located. In one embodiment, the source operands can be located in SIMD registers and/or a memory location. With the 64 bit long operands of this embodiment, each operand has four word sized data elements.

The calculations for these four pairs of source data elements are shown as four sets of equations at block 747. The first equation 'TEMP[31:0]=A[15:0]×B[15:0]' represents the multiplication of the source data elements. The second equation 'INT (TEMP[31:0]>>14)+1' represents the rounding of the intermediate result. For this embodiment, the temporary value is right shifted 14 bits and a '1' is added to the least significant bit. In other words, the upper 18 bits of the intermediate are maintained and a '1' is added to what was originally bit 14. The third equation 'DEST[15:0]=TEMP[16:1]' represents the shift and truncate of the rounded result. Each resultant data element is also a word in this case, thus 16 bits are needed. Note that bits[16:1] of the remaining 18 bits are extracted here. In this embodiment, the shift left happens by taking 16 bits immediately to the left of the least significant bit. The truncated value is stored as the resultant for that data element position. These three equations are repeated for each data element position at block 747 except that the bit ranges are filled with the correct values of that position (i.e., [15:0], [31:15], [47:32], and [63:48]).

If the operand size is determined to be 128 bits in length at block 744, a register file and/or memory is accessed at block 748 to obtain the requisite operand data. For 128 bit long operands of this embodiment, each operand has eight word sized data elements. As with the 64 bit path, each of the eight pairs of source data elements are processed at block 749 with the set of three equations described above. The correct bit ranges for the eight sets of equations in this 128 bit path are [15:0], [31:15], [47:32], [63:48], [79:64], [95:80], [111:96], and [127:112]. Although the two paths described in this example involve 64 and 128 bit operands, operands of various other lengths can also operate with alternative embodiments.

The eight 16 bit values, one for each data element position, are stored in their respective data element positions in DEST.

Thus, techniques for a simd integer multiply with round and shift are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A computer implemented method for performing a multiply high with round and shift operation, the method comprising:
   in response to a single instruction identifying a first operand at a first register having a first set of L data elements and a second operand at a second register having a set of L data elements, a microprocessor executing the single instruction to perform,
      multiplying together L pairs of data elements to generate a set of L products, wherein each of said L pairs includes a first data element from said first set of L data element and a second data element from a corresponding data element position of said second set of L data elements;
      shifting each of said L products to the right by fourteen bits to generate L shifted values to be 18 bits wide;
      rounding each of said L shifted values to generate L rounded values by adding a '1' to a least significant bit position each of said L shifted values;
      scaling each of said L rounded values right by one bit to generate a set of L scaled values;
      truncating each of said L scaled values to generate L truncated values by selecting sixteen least significant bits from each of said L scaled values to obtain said L truncated values; and
      storing said L truncated values at a destination register indicated by said single instruction as a final result of the single instruction, wherein each truncated value is to be stored at a data element position corresponding to its pair of data elements.

2. The method of claim 1 wherein each data element position of said first and second operands are processed in parallel.

3. The method of claim 2 wherein said processing comprises said multiplying, said shifting, said rounding, said scaling, said truncating, and said storing.

4. The method of claim 1 wherein said first operand and said second operand are each packed data operands comprised of a plurality of data elements.

5. The method of claim 4 wherein each of said data elements holds a signed integer value.

6. The method of claim 1 wherein said destination is a packed data block.

7. The method of claim 6 wherein each data element is a word in length.

8. The method of claim 7 wherein said first operand, said second operand, and said destination are each 64 bits in length.

9. The method of claim 7 wherein said first operand, said second operand, and said destination are each 128 bits in length.

10. The method of claim 7 wherein said first operand and said second operand reside in SIMD registers.

11. A method comprising:
    receiving a single instruction to cause a hardware execution unit of a microprocessor to perform a packed multiply high with round and shift operation on two operands in response to the single instruction, wherein said packed multiply with round and shift operation comprises
       multiplying each data element in a first set of packed data elements with a corresponding data element in a second set of packed data elements to generate a set of products,
       rounding and shifting each of said set of products to generate a set of results, and
       selecting a plurality of bits from each of said results to generate a set of truncated results;
    said single instruction having a format comprising:
       a first field that has stored therein an op code that specifies said packed multiply with round and shift operation and whether said set of truncated results for said packed multiply high with round and shift operation is comprised of high order bits or low order bits of said set of results;
       a second field that has stored therein data that specifies a first source address for a first operand having said first set of packed data elements; and
       a third field that has stored therein data that specifies a second source address for a second operand having said second set of packed data elements; and
    executing said single instruction at the hardware execution unit of the microprocessor to generate said set of truncated results for; and
    storing said set of truncated results as packed data elements in a destination register as a final result.

12. The method of claim 11 wherein said first source address is a first address of a first register to store said first set of packed data elements.

13. The method of claim 12 wherein said first register is also a destination for said set of truncated results for said packed multiply with round and shift operation.

14. The method of claim 13 wherein said second source address is a second address of a second register to store said second set of packed data elements.

15. The method of claim 11 wherein said first field includes a bit to indicate whether said packed multiply with round and shift operation is a signed operation or an unsigned operation.

16. The method of claim 15 wherein said first field further includes at least two bits to indicate whether each plurality of bits selected from said set of results are comprised of high order bits of a particular result or of low order bits of said result.

17. The method of claim 11 wherein said format further comprises a sign field to indicate whether said packed multiply with round and shift operation is a signed or unsigned operation.

18. The method of claim 17 wherein said format further comprises a size field to indicate a length of each of said packed data elements.

19. The method of claim 18 wherein said format further comprises a fourth field to specify a destination address to receive said set of results for said packed multiply with round and shift operation.

20. The method of claim 11 wherein said information for said op code indicates a packed multiply with round and shift of signed integers and to select high order bits of each of said results for a truncated result.

21. The method of claim 11 wherein said rounding comprises adding '1' to bit 14 each of said products to obtain a set of rounded values and wherein said shifting comprises shifting each of said rounded values left one bit position.

22. The method of claim 21 wherein each plurality of bits from each of said results are sixteen high order bits of that particular result.

23. An apparatus comprising:
a hardware execution unit of a microprocessor to perform a packed multiply with round and shift operation responsive to a single instruction, wherein said execution unit in response to only said single instruction is to,
multiply each data element in a first set of packed data elements with a corresponding data element in a second set of packed data elements to generate a set of products,
round each of said set of products to generate a set of results
shift each of said set of results to generate an intermediate set of results,
select a plurality of bits from each of said results to generate a set of truncated results, and
store said set of truncated results as a final result,
wherein said single instruction having a format comprising:
a first field to specify an op code to provide information about said packed multiply with round and shift operation, wherein said op code is to indicate whether said set of truncated results for said packed multiply high with round and shift operation is comprised of high order bits or low order bits of said set of results,
a second field to specify a first source address for a first operand having said first set of packed data elements, and
a third field to specify a second source address for a second operand having said second set of packed data elements.

24. The apparatus of claim 23 wherein said truncated results comprises selected portions of each of said results are stored as packed data elements in a destination register.

25. The apparatus of claim 24 wherein said op code is to indicate whether said set of truncated results for said packed multiply high with round and shift operation is comprised of high order bits or low order bits of said set of results.

26. The apparatus of claim 23 wherein said first source address is a first address of a first register to store said first set of packed data elements and said second source address is a second address of a second register to store said second set of packed data elements.

27. The apparatus of claim 26 wherein said first register is also a destination for said set of truncated results for said packed multiply with round and shift operation.

28. The apparatus of claim 23 wherein said first field includes a bit to indicate whether said packed multiply with round and shift operation is a signed operation or an unsigned operation.

29. The apparatus of claim 28 wherein said first field further includes at least two bits to indicate whether each plurality of bits selected from said set of results are comprised of high order bits of a particular result or of low order bits of said result.

30. The apparatus of claim 23 wherein said format further comprises a sign field to indicate whether said packed multiply with round and shift operation is a signed or unsigned operation.

31. The apparatus of claim 30 wherein said format further comprises a size field to indicate a length of each of said packed data elements.

32. The apparatus of claim 31 wherein said format further comprises a fourth field to specify a destination address to receive said set of results for said packed multiply with round and shift operation.

33. The apparatus of claim 23 wherein said information for said op code indicates a packed multiply with round and shift of signed integers and to select high order bits of each of said results for a truncated result.

34. The apparatus of claim 23 wherein said rounding comprises adding '1' to bit 14 each of said products to obtain a set of rounded values and wherein said shifting comprises shifting each of said rounded values left one bit position.

35. The apparatus of claim 34 wherein each plurality of bits from each of said results are sixteen high order bits of that particular result.

36. A system comprising:
a memory to store a first instruction; and
a processor to fetch the first instruction from the memory and, in response to executing the first instruction, the processor is to:
multiply each data element in a first set of packed data elements with a corresponding data element in a second set of packed data elements to generate a set of products,
round each of said set of products to generate a set of temporary results,
scale each of said set of temporary results to generate a set of scaled temporary results,
select a plurality of bits from each of said scaled temporary results to generate a set of truncated results, and
store said set of truncated results as a final result; and
wherein said first instruction has a format comprising:
a first field to specify an op code to provide information about said packed multiply with round and shift operation, wherein said information of said op code indicates a packed multiply with round and shift of signed integers and to select high order bits of each of said results for a truncated result,
a second field to specify a first source address for a first operand having said first set of packed data elements, and
a third field to specify a second source address for a second operand having said second set of packed data elements.

37. The system of claim 36 wherein said rounding comprises adding '1' to bit 14 each of said products to obtain a set of rounded values and wherein said shifting comprises shifting each of said rounded values left one bit position.

38. The system of claim 37 wherein each plurality of bits from each of said results are sixteen high order bits of that particular result.

39. The system of claim 38 wherein said first field includes a bit to indicate whether said packed multiply with round and shift operation is a signed operation or an unsigned operation.

40. The system of claim 39 wherein said first field further includes at least two bits to indicate whether each plurality of bits selected from said set of results are comprised of high order bits of a particular result or of low order bits of said result.

41. The system of claim 36 wherein said op code is to indicate whether said set of truncated results for said multiply with round and shift operation is comprised of high order bits or low order bits of said set of results.

42. The system of claim 36 wherein said format further comprises:
a sign field to indicate whether said packed multiply with round and shift operation is a signed or unsigned operation; and
a size field to indicate a length of each of said packed data elements.

43. The system of claim 36 wherein said format further comprises a fourth field to specify a destination address to receive said set of results for said packed multiply with round and shift operation.

44. The system of claim 36 wherein said truncated results comprising selected portions of each of said results are stored as packed data elements in a destination register.

45. The system of claim 36 wherein said first source address is a first address of a first register to store said first set of packed data elements and said second source address is a second address of a second register to store said second set of packed data elements.

46. The system of claim 36 wherein said first register is also a destination for said set of truncated results for said packed multiply with round and shift operation.

47. The system of claim 36 further comprising:
a wireless communication device to send and receive digital data over a wireless network, said wireless communication device coupled said memory to store said digital data and software, wherein said software include said multiply with round and shift instruction; and
an input output system responsive to said software to interface with said wireless communication device, said input output system to receive data for processing or to send data processed at least in part by said multiply with round and shift instruction.

48. A machine readable storage medium storing a program, said program being executable by a computer system to perform a method comprising:
responsive to executing a single instruction, wherein the single instruction designates a first operand at a first storage register having a first set of L data elements and a second operand at a second storage register having a second set of L data elements, the computer system performing the following acts,
multiplying together L pairs of data elements to generate a set of L products, wherein each of said L pairs includes a first data element from said first set of L data element and a second data element from a corresponding data element position of said second set of L data elements;
shifting each of said L products to generate L shifted values;
rounding each of said L shifted values to generate L rounded values;
scaling each of said L rounded values to generate L scaled values;
truncating each of said L scaled values for storage at a destination by selecting sixteen least significant bits from each of said L scaled values to obtain L truncated values, wherein each truncated value is to be stored at a data element position corresponding to its pair of data elements; and
storing each of said L truncated values as a final result at a destination storage register.

49. The machine readable storage medium of claim 48 wherein said rounding further comprises adding a '1' to a designated bit location for each of said L products.

50. The tangible computer-readable storage medium of claim 49 wherein said designated bit location is a least significant bit position each of said L shifted values.

51. The machine readable storage medium of claim 48 wherein each data element position of said first and second operands are processed in parallel, said processing comprising said multiplying, said shifting, said rounding, said scaling, said truncating, and said storing.

52. The machine readable storage medium of claim 48 wherein
said shifting of each of said L products is to the right by fourteen bits to generate the L shifted values.

53. The machine readable storage medium of claim 48 wherein said first operand and said second operand are each packed data operands comprised of a plurality of data elements.

54. The machine readable storage medium of claim 53 wherein each of said data elements holds a word length signed integer value.

55. The machine readable storage medium of claim 54 wherein said first operand, said second operand, and said destination are each 64 bits in length.

56. The machine readable storage medium of claim 54 wherein said first operand, said second operand, and said destination are each 128 bits in length.

57. A machine readable storage medium storing a program, said program being executable by a computer system to perform a method comprising:
responsive to executing a single instruction, the computer system performing the following acts,
multiplying each data element in a first operand with a corresponding data element in a second operand to generate a set of products,
rounding each of said set of products to generate a set of rounded intermediate results,
shifting each of said set of rounded intermediate results to generate a set of scaled results,
selecting a plurality of bits from each of said scaled results to generate a set of resultant data elements, and
storing said set of resultant data elements as a final result,
said single instruction having a format comprising:
a first field that has stored therein an op code that specifies said packed multiply with round and shift operation and whether said set of truncated results for said packed multiply high with round and shift operation is comprised of high order bits or low order bits of said set of results;
a second that has stored therein data that specifies a first source address for a first operand having said first set of packed data elements; and
a third field that has stored therein data that specifies a second source address for a second operand having said second set of packed data elements.

* * * * *